(12) United States Patent
Thompson et al.

(10) Patent No.: US 9,759,838 B2
(45) Date of Patent: Sep. 12, 2017

(54) CORRELATION TECHNIQUES FOR PASSIVE ELECTROSEISMIC AND SEISMOELECTRIC SURVEYING

(71) Applicant: Hunt Energy Enterprises, L.L.C., Dallas, TX (US)

(72) Inventors: Arthur Thompson, Houston, TX (US); Alan Katz, Dallas, TX (US); Robert England, Flower Mound, TX (US); Mohammad Rahman, Dallas, TX (US); Naga P. Devineni, Irving, TX (US)

(73) Assignee: ES XPLORE, L.L.C., Dallas, TX (US)

( * ) Notice: Subject to any disclaimer, the term of this patent is extended or adjusted under 35 U.S.C. 154(b) by 340 days.

(21) Appl. No.: 14/515,271

(22) Filed: Oct. 15, 2014

(65) Prior Publication Data
US 2015/0071033 A1    Mar. 12, 2015

Related U.S. Application Data

(63) Continuation of application No. 13/785,106, filed on Mar. 5, 2013, now Pat. No. 8,873,334.

(51) Int. Cl.
*G01V 1/28* (2006.01)
*G01V 11/00* (2006.01)
*G01V 1/36* (2006.01)
*G01V 1/38* (2006.01)
(Continued)

(52) U.S. Cl.
CPC .............. *G01V 11/007* (2013.01); *G01V 1/28* (2013.01); *G01V 1/36* (2013.01); *G01V 1/364* (2013.01); *G01V 1/38* (2013.01); *G01V 1/42* (2013.01); *G01V 1/48* (2013.01); *G01V 11/00* (2013.01)

(58) Field of Classification Search
CPC . G01V 1/28; G01V 1/30; G01V 11/00; G01V 1/364; G01V 1/42
See application file for complete search history.

(56) References Cited

U.S. PATENT DOCUMENTS

| 4,507,611 | A | 3/1985 | Helms |
| 4,573,148 | A | 2/1986 | Herkenhoff et al. |
| 4,686,475 | A | 8/1987 | Kober et al. |

(Continued)

FOREIGN PATENT DOCUMENTS

| GB | 2 459 365 | 10/2009 |
| WO | WO 2010/080366 | 12/2009 |

OTHER PUBLICATIONS

International Search Report and Written Opinion issued in related PCT Application No. PCT/US2014/019439 mailed Dec. 15, 2014, 12 pages.

(Continued)

*Primary Examiner* — Hovhannes Baghdasaryan
(74) *Attorney, Agent, or Firm* — Baker Botts L.L.P.

(57) ABSTRACT

A method for surveying, may include receiving, by a processor, first survey data from a first source, the first source comprising a first signal generated by a subsurface earth formation in response to a passive-source electromagnetic signal, wherein the electromagnetic signal is generated by an electroseismic or seismoelectric conversion of the passive-source electromagnetic signal. The method may also include receiving, by the processor, second survey data from a second source and processing the first survey data and the second survey data to determine one or more properties of a subsurface earth formation.

20 Claims, 11 Drawing Sheets

(51) Int. Cl.
*G01V 1/48* (2006.01)
*G01V 1/42* (2006.01)

(56) References Cited

U.S. PATENT DOCUMENTS

| | | |
|---|---|---|
| 4,825,165 A | 4/1989 | Helms et al. |
| 4,841,250 A | 6/1989 | Jackson |
| 4,904,942 A | 2/1990 | Thompson |
| 4,964,098 A | 10/1990 | Hornbostel |
| 5,041,792 A | 8/1991 | Thompson |
| H1490 H | 9/1995 | Thompson et al. |
| 5,486,764 A | 1/1996 | Thompson et al. |
| H1524 H | 4/1996 | Thompson et al. |
| H1561 H | 7/1996 | Thompson |
| 5,777,478 A | 7/1998 | Jackson |
| 5,877,995 A | 3/1999 | Thompson et al. |
| 6,462,549 B1 | 10/2002 | Curtis et al. |
| 6,476,608 B1 | 11/2002 | Dong |
| 6,477,113 B2 | 11/2002 | Hornbostel et al. |
| 6,664,788 B2 | 12/2003 | Hornbostel et al. |
| 6,950,747 B2 | 9/2005 | Byerly |
| 7,248,052 B2 | 7/2007 | Weaver et al. |
| 7,330,790 B2 | 2/2008 | Berg |
| 7,340,348 B2 | 3/2008 | Strack et al. |
| 7,397,417 B2 | 7/2008 | Jackson |
| 7,573,780 B2 | 8/2009 | Thompson et al. |
| 8,169,222 B2 | 5/2012 | Hornbostel et al. |
| 8,347,658 B2 | 1/2013 | Thompson et al. |
| 2002/0181326 A1 | 12/2002 | Hornbostel et al. |
| 2006/0132137 A1 | 6/2006 | MacGregor et al. |
| 2007/0257830 A1 | 11/2007 | Savage et al. |
| 2007/0294036 A1 | 12/2007 | Strack et al. |
| 2009/0108845 A1 | 4/2009 | Kaminski |
| 2010/0225324 A1 | 9/2010 | Strack et al. |
| 2013/0066561 A1 | 3/2013 | Thompson et al. |
| 2013/0069654 A1 | 3/2013 | Thompson et al. |
| 2013/0070562 A1 | 3/2013 | Thompson et al. |
| 2013/0073210 A1 | 3/2013 | Thompson et al. |
| 2013/0119993 A1 | 5/2013 | Thompson et al. |

OTHER PUBLICATIONS

U.S. Appl. No. 61/469,498, filed Mar. 30, 2011, Arthur Thompson.
PCT Notification of Transmittal of the International Search Report and the Written Opinion of the International Searching Authoritiy of the Declaration; Int'l application No. PCT/US2012/030750; 25 pages, Sep. 18, 2012.
Simpson, Fiona, et al.; "Practical Magnetotellurics,"Feb. 15, 2005, Cambridge University Press, Feb. 14, 2005.
European Search Report; European Patent Application No. 12161617.1.-2213; dated Jul. 4, 2012, 6 pages, Jul. 4, 2012.
U.S. Appl. No. 61/528,421, Aug. 29, 2011, Alan Katz.
H. Roder, et al.; "Seismo-electrical effects: Experiments and Field Measurements;" Applied Physics Letters, AIP, American Institute of Physics, Melville, NY, US, vol. 80, No. 2; XP012030927; pp. 334-336, Jan. 14, 2002.
Arthur Thompson et al., Patent Application entitled "Method and System for Passive Electroseismic Surveying" and Preliminary Amendment, U.S. Appl. No. 13/712,177, filed Dec. 12, 2012, 146 pages.
Robert England et al., Patent Application entitled, "Sensors for Passive Electroseismic and Seismoelectric Surveying" U.S. Appl. No. 13/785,372, filed Mar. 5, 2013, 91 pages.

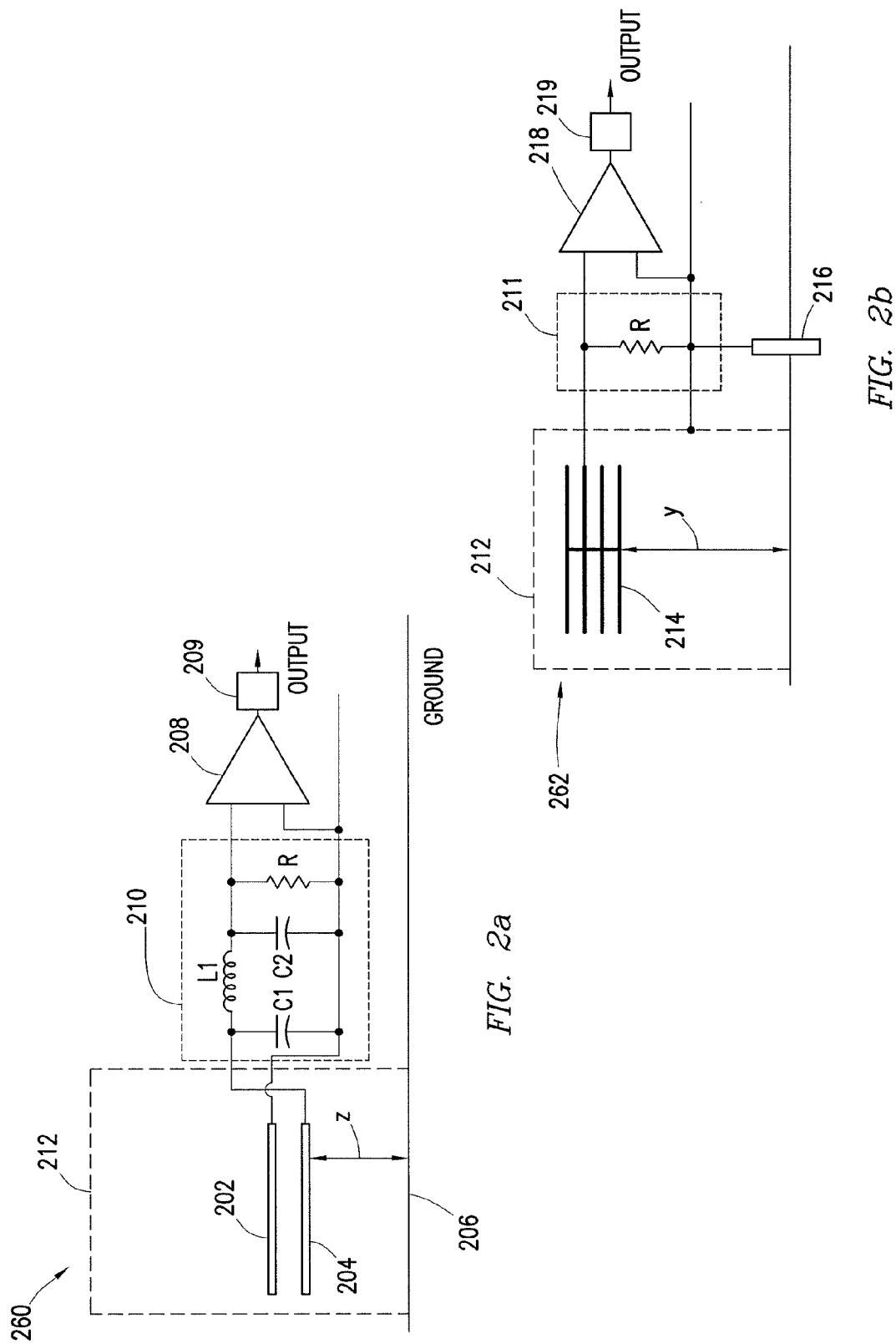

CORRELATION TECHNIQUES FOR PASSIVE ELECTROSEISMIC AND SEISMOELECTRIC SURVEYING

RELATED APPLICATION

This application is a continuation of U.S. application Ser. No. 13/785,106 filed Mar. 5, 2013 and entitled "Correlation Techniques for Passive Electroseismic and Seismoelectric Surveying".

BACKGROUND OF THE INVENTION

Conventional geophysical surveying techniques rely on various surveying technologies to identify prospective regions for drilling or exploration. These conventional surveying technologies, however, suffer from certain limitations that may prevent a full understanding of the geophysical properties of prospective regions. For example, particular surveying techniques may require the use of expensive and/or time consuming surveying equipment and methods that may limit the economic viability of surveying a particular prospective region. In addition, particular surveying technologies may be able to provide information regarding one or more geophysical properties of a subsurface region, but may not be able to provide information on other geophysical properties. Such limitations may lead to the identification of prospective regions for drilling or exploration based on an incomplete and/or incorrect understanding of the prospective region, which may cause unnecessary time and/or expenses to be incurred exploring or drilling regions that do not have the desired geophysical properties. For example, based on incomplete or incorrect geophysical surveying, a drilling operation may drill a dry hole or drill into a subsurface formation that holds fewer hydrocarbons than expected. As another example, an exploration company may miscalculate the estimated amount of reserves in a subsurface formation.

SUMMARY

In accordance with the teachings of the present disclosure, disadvantages and problems associated with conventional geophysical surveying techniques may be reduced and/or eliminated. For example, a surveying system may be provided using passive electroseismic or seismoelectric surveying techniques. The surveying system may utilize survey data from passive electroseismic or seismoelectric surveying and survey data from other geophysical surveying methods to determine one or more properties of a subsurface earth formation.

In accordance with one embodiment of the present disclosure, a method for surveying, may include receiving, by a processor, first survey data from a first source, the first source comprising a first signal generated by a subsurface earth formation in response to a passive-source electromagnetic signal, wherein the electromagnetic signal is generated by an electroseismic or seismoelectric conversion of the passive-source electromagnetic signal. The method may also include receiving, by the processor, second survey data from a second source and processing the first survey data and the second survey data to determine one or more properties of a subsurface earth formation.

Technical advantages of certain embodiments of the present invention include the ability to perform passive electroseismic or seismoelectric surveying. Such surveying may be able to detect an electromagnetic signal generated in response to an electroseismic or seismoelectric conversion of the earth's background electric field. The electroseismic or seismoelectric conversion may take place in a subsurface earth formation. The detected electromagnetic signal may be a vertical signal that is responsive to a vertical component of the earth's background electric field. Another technical advantage may be the ability to detect a seismic signal generated in response to an electroseismic or seismoelectric conversion of the earth's background electric field. Using such techniques, geophysical surveying may be performed without the requirement for expensive active sources of electromagnetic or seismic energy, which may improve site safety and reduce any environmental impacts. The reduction in the amount of equipment and power, along with the corresponding reduced footprint at the measurement site, may be an advantage over other surveying systems and methods. From an environmental and health perspective, the reduction in transportation, site preparation, and high energy sources may improve the overall health and safety of the workers operating the equipment. In addition, the earth's naturally occurring electromagnetic field comprises a broad spectrum of frequencies, from sub-hertz frequencies to tens of thousands of hertz frequencies, along with a broad coverage over the surface of the earth. This broad spectrum allows for a broad range of penetration depths from tens of meters to tens of kilometers. Accordingly, the electromagnetic and/or seismic signals detected may be processed to identify various properties of the subsurface earth formation. Another technical advantage may include the ability to utilize survey data from passive electroseismic or seismoelectric surveying and survey data from other geophysical surveying methods to determine one or more properties of a subsurface earth formation. For example, the data from the first survey method may be correlated to the data from the second survey method. Utilizing data from two or more survey methods may allow for a more complete and/or reliable understanding of the subsurface formation of interest.

Other technical advantages of the present disclosure will be readily apparent to one of ordinary skill in the art from the following figures, description, and claims. Moreover, other specific advantages of particular surveying techniques and combinations are discussed below. Moreover, while specific advantages are explained in the present disclosure, various embodiments may include some, all, or none of those advantages.

BRIEF DESCRIPTION OF THE DRAWINGS

For a more complete understanding of the present invention and its features and advantages, reference is now made to the following description, taken in conjunction with the accompanying drawings, in which:

FIGS. 2A-2C are block diagrams illustrating example sensors for passive electroseismic and seismoelectric surveying;

DESCRIPTION OF EXAMPLE EMBODIMENTS

Figure 1A:
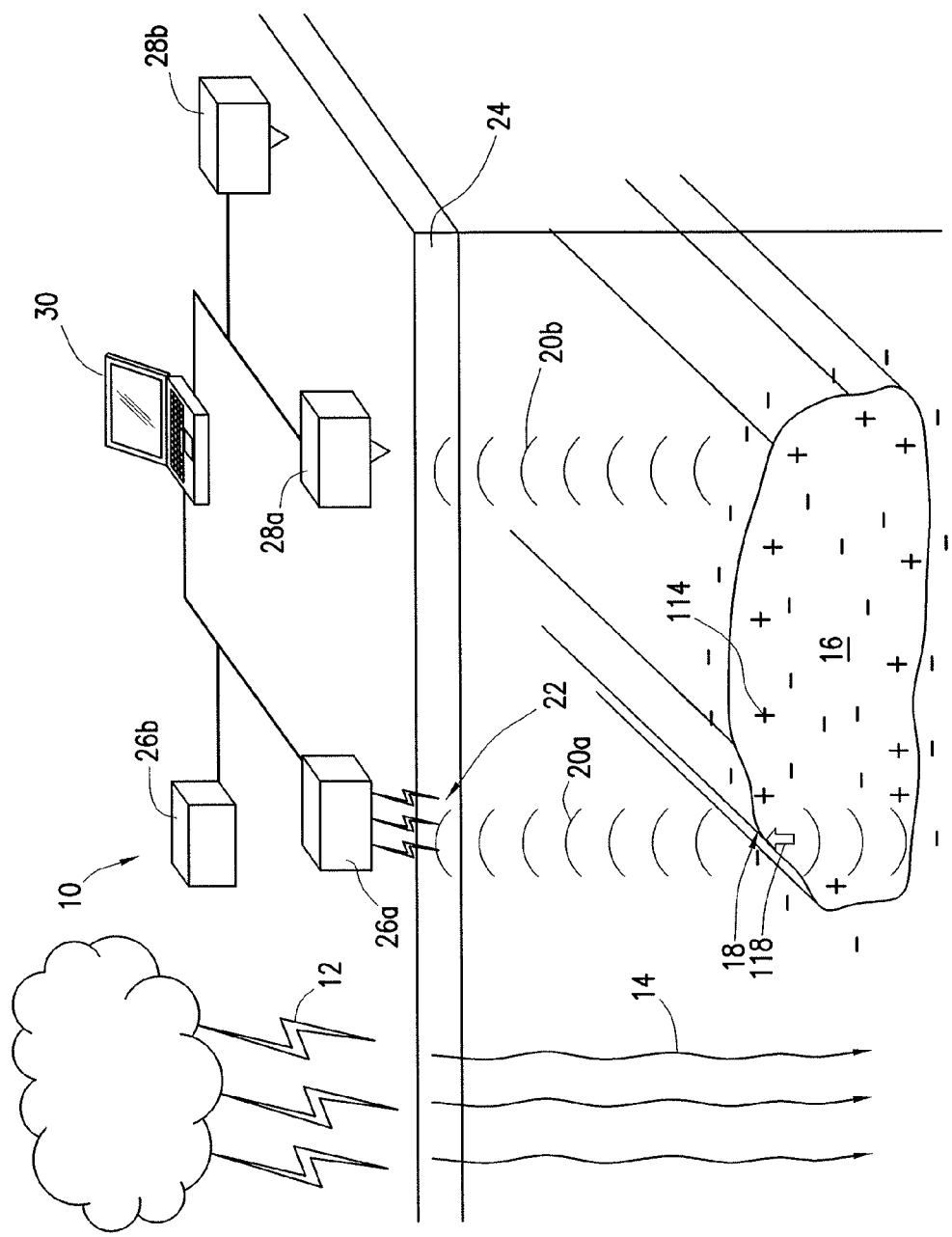
FIG. 1A is a perspective diagram illustrating an example system for passive electroseismic and seismoelectric surveying.

The example embodiments herein may utilize passive surveying techniques that utilize passive sources, such as naturally occurring electromagnetic fields and/or seismic waves, and the interactions of electromagnetic or seismic signals generated by those sources with subsurface formations through electroseismic and/or seismoelectric conversions to identify features and/or properties of subsurface earth formations. Such surveying may be useful for a variety of purposes, including the identification of subsurface water and minerals. While passive surveying may be suitable for use as a standalone method of geophysical surveying, passive surveying may, in some embodiments, be performed in conjunction with other geophysical surveying methods to identify properties of subsurface earth formations. The teachings of the present disclosure are intended to encompass embodiments that employ passive surveying as a standalone surveying technique as well as embodiments that use passive surveying in conjunction with one or more other methods of geophysical surveying.

A passive source may be utilized to provide the energy for generating electroseismic and/or seismoelectric conversions in a subsurface formation or structural feature. For example, the earth's electromagnetic field and/or environmental seismic energy may induce electroseismic or seismoelectric conversions in a subsurface earth formation that holds hydrocarbons or other minerals. As used herein, a "passive source" may include any source that is not being actively initiated by a surveying operation to actively generate a source of seismic and/or electromagnetic energy. Although a passive source generally includes a natural source of electromagnetic energy and/or seismic energy such as the earth's natural electromagnetic field, other man-made sources of electromagnetic and/or seismic radiation such as electrical power lines or mechanical equipment may also be included as passive sources in particular embodiments. While certain man-made sources may induce an electromagnetic field or seismic wave, they are distinguishable from an "active source" such as a seismic generator, explosives, electric field generators, and the like in that such sources are generally initiated by and/or are associated with a surveying operation to facilitate surveying a subterranean formation. As used herein, "passive surveying," "passive electroseismic surveying," and "passive seismoelectric surveying" may refer to surveying that utilizes a passive source as opposed to an active source. Passive surveying may detect the generation of secondary seismic waves through coupling of the electromagnetic source field to various rock formations (electroseismic effect) and subsequent generations of secondary electromagnetic fields through coupling of the generated seismic waves with various rock formations (seismoelectric effect) to probe those formations and the fluids they contain. Alternatively or in addition, passive surveying may detect the generation of secondary electromagnetic fields through coupling of a seismic source field to various rock formations (seismoelectric effect) and subsequent generations of secondary seismic waves through coupling of the generated electromagnetic fields with various rock formations (electroseismic effect) to probe those formations and the fluids they contain. Generation of tertiary and higher order electromagnetic fields and seismic waves can also result from additional couplings as the fields propagate towards the surface of the earth.

Other surveying techniques such as magnetotelluric surveying or controlled-source electroseismic surveying typically reject signals generated by such passively-generated conversions as background noise. Utilizing the teachings of the present disclosure, however, electromagnetic and seismic signals generated by seismoelectric and electroseismic conversions in response to a passive source of energy may be detected and processed using various data processing techniques to identify properties of the subsurface earth formation. For example, a generated seismic signal may be identified by detecting the characteristic time lags or frequencies associated with the seismic travel time using a time-selective method and determining the depth of origin of the seismic signal from said time selective method.

Electromagnetic and/or seismic signals generated as a result of electroseismic or seismoelectric conversions may be detected in any appropriate manner. For example, various sensors may be utilized to detect one or more of an electromagnetic signal and a seismic signal that are generated by a subsurface earth formation in response to a passive-source electromagnetic or seismic signal, wherein the electromagnetic signal is generated by an electroseismic or seismoelectric conversion of the passive-source electromagnetic or seismic signal. In some embodiments, arrays of sensors may be utilized. Data processing may be utilized to process signals to facilitate identification of one or more of the subsurface earth formation properties discussed above.

Using these techniques, various properties of the subsurface earth formation may be identified. For example, processing the detected signal may indicate the presence of fluids such as hydrocarbons and aqueous fluid such as potable water, fresh water, and brine water in the subterranean formation. In some embodiments, the teachings of the present disclosure may be utilized to identify additional properties of the subsurface earth formation, including but not limited to the existence of the subsurface earth formation, depth of the subsurface formation, porosity and/or fluid permeability of the subsurface earth formation, the composition of one or more fluids within the subsurface earth formation, a spatial extent of the subsurface earth formation, an orientation of the boundaries of the subsurface earth formation, and resistivity of the subsurface earth formation. Based on the identified properties, models may be developed of the subsurface earth formation, including three-dimensional and structures and time-dependent models. In addition or in the alternative, the techniques of the present disclosure may be utilized to identify the presence of and/or migration of various pollutants, flooding in hydrocarbon production, fault movement, aquifer depth, water use, the presence of and/or migration of magma, and hydrofracturing properties.

In some embodiments, passive survey data obtained and/or collected as a result of passive surveying may be processed with geophysical survey data obtained and/or collected using various other surveying techniques. Processing passive survey data and other available sources of geophysical survey data may provide various technical benefits. For example, such processing may allow additional information, more complete information, and/or confirmation of information regarding subsurface earth formations. Such processing may take advantage of particular strengths of other survey methods to establish a baseline for comparison and/or determine particular properties for which those methods are well-suited. As a result, passive surveying techniques combined with other available surveying techniques may result in a more complete understanding of the subsurface formation than would otherwise have been available if the individual techniques were used alone.

While specific advantages have been enumerated above, various embodiments may include all, some, or none of the enumerated advantages. Embodiments of the present disclosure and its advantages are best understood by referring to FIGS. 1 through 9, wherein like numerals refer to like and corresponding parts of the various drawings.

Figure 1B:
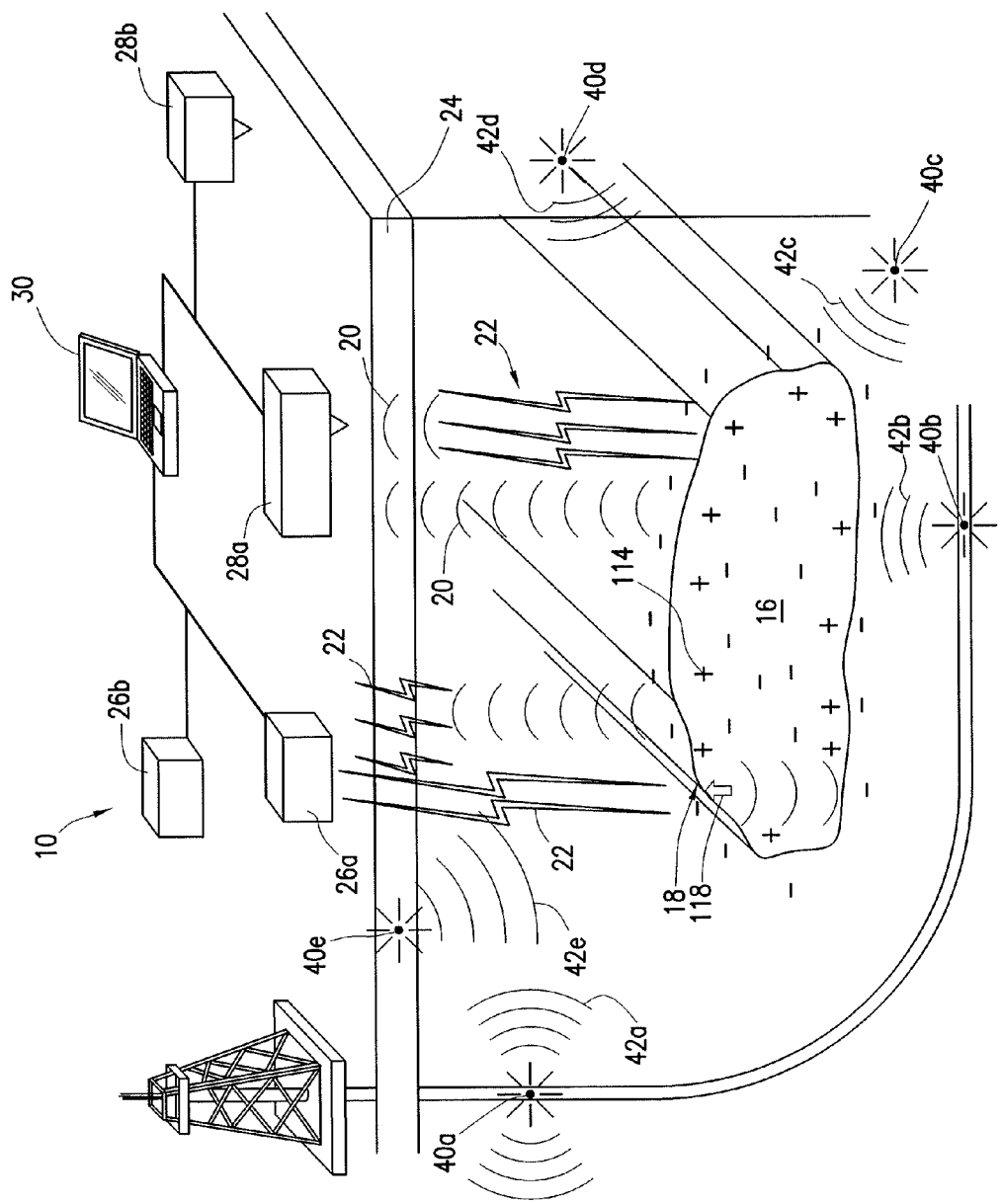
FIG. 1B is a perspective diagram illustrating an example system for passive electroseismic and seismoelectric surveying.

FIGS. 1A and 1B are perspective diagrams illustrating an example system 10 for passive electroseismic and seismoelectric surveying. System 10 includes electromagnetic sensors 26, seismic sensors 28, and computing system 30. FIG. 1A illustrates an embodiment in which system 10 is generally configured to utilize signals 14 propagated by a passive electromagnetic source 12 of electromagnetic energy to perform geophysical surveying. FIG. 1B illustrates an embodiment in which system 10 is generally configured to utilize signals 20 and/or 22, which may be propagated by a passive seismic source 40.

As illustrated in FIG. 1A, sensors 26 and/or 28 generally detect signals generated by subsurface earth formation 16 in response to a electromagnetic signal 14 propagated from passive electromagnetic source 12. Computing system 30 may then process detected signals using various signal processing techniques to identify properties and/or features of subsurface earth formation 16. System 10 may detect seismic signals 20 generated due to the electroseismic interactions between the electromagnetic signal 14 and the subsurface formation 16, either alone or in combination with detecting electromagnetic signal 22, which may be generated as a result of seismoelectric conversions of seismic signals 20. One or more of the detected signals may then be processed to determine one or more properties of the subsurface earth formation.

Passive electromagnetic source 12 represents any appropriate passive source of electromagnetic energy. For example, passive electromagnetic source 12 may represent the earth's natural electromagnetic field. Passive electromagnetic source 12 propagates electromagnetic energy into the subsurface of the earth as electromagnetic signal 14. Electromagnetic signal 14 may represent, for example, an electromagnetic plane wave 14. As electromagnetic signal 14 propagates into the earth, it may encounter various subsurface earth formations 16. The interaction of electromagnetic signal 14 and subsurface earth formation 16 may cause an electroseismic conversion to take place at an edge and/or boundary 18 of subsurface formation 16. As a result, one or more seismic waves 20 may propagate towards the surface of the earth. Electromagnetic signal 22 may be generated as a result of a seismoelectric conversion as seismic signals 20a propagate towards the surface. Electromagnetic sensors 26 may detect electromagnetic signals 22. Seismic sensors 28 may detect seismic signals 20b.

Passive electromagnetic source 12 may represent earth's naturally occurring electromagnetic field. Earth's naturally occurring electromagnetic field may include a broad spectrum of frequencies, from sub-hertz frequencies to tens of thousands of hertz frequencies, having a broad coverage over the surface of the earth. This broad spectrum allows for a broad range of penetration depths of electromagnetic signal 14 from tens of meters to tens of kilometers. The corresponding frequencies of electromagnetic signal 14 in the earth may result from variations in passive electromagnetic source 12 due to various natural events such as electromagnetic fluctuations in the ionosphere, naturally occurring electromagnetic discharges in the atmosphere such as lightning, and/or other electromagnetic events. In some embodiments, passive electromagnetic source 12 of electromagnetic signals 14 may include cultural sources of electromagnetic radiation, which may have sufficiently low frequencies to reach and interact with subterranean formation 16. As another example, passive electromagnetic source 12 may include power transmission lines, which may generate electromagnetic signals 14 of appropriate strength and/or frequency to interact with subterranean formation 16.

Electromagnetic signal 14 represents an electromagnetic wave, electromagnetic plane wave, or other appropriate electromagnetic signal that propagates into the Earth from passive electromagnetic source 12. For example, in response to Earth's electromagnetic field, electromagnetic signal 14 may propagate into the Earth as an electromagnetic modulation that, unlike an acoustic wave, travels at the speed of an electromagnetic wave in the subsurface. The speed of an electromagnetic wave in the subsurface may generally be less than the speed of an electromagnetic wave in a vacuum or air. Electromagnetic signal 14 may typically travel in the subsurface of the earth at a speed of about one hundred times greater than the speed of propagation of an acoustic wave in the seismic frequency band of about 1-100 Hz. Due to the relative speed of electromagnetic signal 14 when compared to a seismic signal, the travel time of the electromagnetic signal 14 into the subsurface earth formation may, in some embodiments, be ignored when processing the detected electromagnetic field 22 and/or detected seismic signals 20. Although illustrated as a static field, it should be noted that electromagnetic signal 14 may be a time-varying field.

Electromagnetic signal 14 may propagate into the subsurface of the earth as an approximate plane wave, including over subsurface formation 16 of interest. The term "plane wave" may refer to a wave with a substantially uniform amplitude on a plane normal to a velocity vector of electromagnetic signal 14. The velocity vector may be generally vertical, although not necessarily perpendicular to the surface of the Earth above subsurface earth formation 16. For example, a velocity vector may be substantially vertical but may appear inclined relative to a vertical axis at the surface where the surface is on an incline, such as on a hillside or other incline. As a result of the electroseismic effect and/or seismoelectric effect, the seismic signals 20 and/or electromagnetic signals 22 resulting from electromagnetic signals 14 may be generated substantially uniformly across subsurface formation 16. As a result, seismic signals 20 and/or electromagnetic signals 22 may each form a substantially vertical plane wave traveling to the surface of the Earth.

Subsurface earth formation 16 represents any subsurface earth formation of interest for the purposes of geophysical surveying. Subsurface earth formation 16 may represent a geologic formation that holds one or more fluids. In some embodiments, subsurface earth formation 16 represents a porous rock formation able to hold fluids. A porous rock formation may, for example, include solid rock portion interspersed with channel-like porous spaces. A porous rock formation may, for example, include an earth substance containing non-earthen volume or pore space, and may include, but is not limited to, consolidated, poorly consolidated, or unconsolidated earthen materials. Fluids held by subsurface earth formation 16 may be hydrocarbons such as oil and gas, water (including fresh, salt, potable, or briny water), helium, carbon dioxide, minerals, or other earth fluids. In some embodiments, subsurface earth formation 16 may represent a formation holding pollutants, magma, or molten material. Subsurface earth formation 16 may represent a geologic layer, a stratigraphic trap, a fault, a fold-thrust belt, or other geographic formation of interest. Subsurface earth formation 16 may represent a prospective or potential area of interest for exploration and/or drilling operations.

Subsurface earth formation 16 may include a polarizable fluid including one or more fluid dipoles 114 associated with a fluid in subsurface earth formation 16. As a result, an electrochemical interaction may form between the polarizable fluid and the solid rock portions at boundary 18. The electrochemical interaction is represented by the "+" symbol in the fluid portion and the "−" symbol in the solid rock portion. Electromagnetic signals 14 may encounter and/or interact with fluid dipoles 114 of subsurface earth formation 16. In particular, the electromagnetic signals 14 may cause a change in the polarization of dipoles 114 in the pore fluid, which in turn may cause a pressure pulse 118 to be generated. For example, electromagnetic signals 14 may modify the electrochemical bonds or move the charges of fluid dipoles 114, thereby effectively creating pressure pulse 118 where the interactions are distorted. Pressure pulse 118 may represent a change in pressure and/or fluid flow that produces a time-varying pressure gradient, which may then propagate and/or be transmitted into the earth formation (or rock) at boundary 18 of subsurface earth formation 16. Electromagnetic signals 14 exist throughout the fluid area and may primarily affect the charges of the dipoles 114 which are at or near boundary 18 of the rock. The pressure gradient produced by pressure pulse 118 may propagate towards the surface as seismic signal 20. In should be noted that the solid rock portion may have an existing natural surface charge over at least a portion of the rock surface. The electrochemical interaction may result in a local pore fluid dipole 114 that causes a local background electromagnetic field. Moreover, the sign of the background electromagnetic field or field polarity direction depends on the surface charge on the solid and the way the fluid screens out that charge. For example, for clay layers, the charge is typically as shown as illustrated. In other materials such as carbonates, however, the charge may be reversed. Thus, an appropriate subsurface formation 16 may be a subsurface source of seismic energy.

Boundary 18 may represent an appropriate edge, boundary, fluid surface, or interface between subsurface earth formation 16 and other portions of the subsurface. Boundary 18 may represent the boundary of a hydrocarbon reservoir, stratigraphic trap, fold thrust belt, geologic rock layer, or other geological formation holding or likely to hold fluids and other minerals of interest. Boundary 18 may represent a boundary between any two types of subsurface materials.

Electroseismic energy conversion may occur at the boundary 18 between two types of rock. For example, the electroseismic energy conversion may occur at the boundary 18 between reservoir rock and the sealing and/or confining rock. Alternatively, electroseismic energy conversion may occur at an interface 18 between pore fluids, for example, between oil and water. At the rock and/or fluid interfaces 18 there may be a gradient in the chemical potential. For example, at the boundary 18 between a silicate rock and a carbonate rock, a chemical reaction may occur in the commingled pore fluids. For example, the silicate may dissolve the carbonate, and the silicate ions in solution may react with the carbonate ions in solution. The overall reaction may be driven by a gradient in the chemical potential at the interface 18. The reaction product between positive and negative ions in solution is electrically neutral and may precipitate out of solution. When a precipitate is formed, the resulting deposition of the precipitate strengthens the rock, increases its hardness, and increases the electrical resistivity of the interface. During the reactions in pore spaces, concentration gradients of charged ions may be created within the pore fluids. These concentration gradients may produce an electrochemical-potential gradient which may manifest itself as a macroscopic electrical potential gradient. The internal electrical potential gradients at the interfaces may create internal stresses, and the interaction of the earth's background electromagnetic field 14 with the electrochemical-potential gradient may change these internal stresses. Due to the natural modulations in the earth's background electromagnetic field 14, the internal stresses may be modulated, accounting for the nonlinear electroseismic conversions that may be measured and used by system 10.

Seismic signals 20 represent any seismic signals and/or seismic waves generated by the electroseismic effect in response to electromagnetic signal 14. As noted above, seismic signals 20 may represent a substantially vertical plane wave that travels towards the surface of the Earth. Seismic signals 20 may generate subsequent secondary electromagnetic fields and seismic waves through various combinations of the electroseismic and seismoelectric effects as seismic signals 20 propagate to the surface. For example, as illustrated, seismic wave 20a may be converted by the seismoelectric effect to an electromagnetic signal 22 at a near surface formation 24. In some embodiments, seismic signals 20 may represent secondary seismic signals generated as a result of various seismoelectric and/or electroseismic conversions of seismic signals 20 as they propagate towards the surface. Seismic signals 20 may represent any mechanical seismic wave that propagates in the subsurface of the earth and may include, but is not limited to, P- and S-waves.

Electromagnetic signals 22 represent any electromagnetic signals, electromagnetic fields, or electromagnetic waves generated by the seismoelectric effect in response to seismic signals 20. As noted above, electromagnetic signals 22 may represent a substantially vertical plane wave traveling to the surface of the Earth. Electromagnetic signals 22 may generate subsequent secondary seismic signals and electromagnetic signals as electromagnetic signals 22 propagate to the surface. Electromagnetic signals 22 may represent secondary electromagnetic signals generated as a result of various seismoelectric and/or electroseismic conversions of seismic signals 20 as they propagate towards the surface. In some embodiments, electromagnetic signals 22 may be detectable in the near-surface of the Earth and/or at some distance above the surface of the Earth. In addition, electromagnetic signals 22 may represent a time-variant electromagnetic field resulting from the seismoelectric effect. Electromagnetic signals 22 may modulate an electromagnetic field within the Earth, such as in the near surface 24 and may thus be referred to as a modulating signal. "Modulation," or "modulating," may refer to frequency modulation, phase modulation, and/or amplitude modulation. For example, seismic signals 20 may travel to the near-surface 24 and directly modulate an electromagnetic field within the near-surface 24. Seismic signals 20 may cause a change in the electrical impedance in near-surface 24, which may result in a time-dependent variation of electromagnetic signals 22 and/or the passage of seismic signals 20 may interact with a fluid or rock boundary at near surface 20 to produce electromagnetic signals 20.

Electroseismic conversions may also produce nonlinear electromagnetic conversions. Seismoelectric and electroseismic effects generate harmonic responses where the coupling of electromagnetic signals 22 and seismic signals 20 create new modulations at frequencies that are harmonics of the electromagnetic signals 22 and seismic signals 20. Accordingly, electromagnetic signals 22 and seismic signals 20 may represent one or more non-linear electromagnetic responses. Nonlinear electroseismic conversions may produce signals useful during processing. In some embodiments, nonlinear, harmonic signals having frequency components at higher frequency harmonics of the passive electromagnetic source 12's fundamental frequency, such as those frequencies present in the earth's background electromagnetic field, may be detected as a result of distortions of electromagnetic signals 14 interacting with subsurface earth formation 16 when it contains at least one fluid. The harmonic signals may be processed alone or in conjunction with the fundamental frequencies of the seismic signals 20 and/or the electromagnetic signals 22 to determine one or more properties of the subsurface earth formation. In some embodiments, system 10 may be utilized to detect and/or isolate the harmonic signals that may be present in both electromagnetic signals 22 and seismic signals 20.

Subsurface formation 16 may generate seismic signals 20 and/or electromagnetic signals 22 particularly when fluid is present in a porous formation, such as formations of high permeability. Accordingly, seismic signals 20 and/or electromagnetic signals 22 may indicate the presence of that fluid and/or may be utilized by system 10 to locate and/or potentially locate particular fluids, such as hydrocarbons, water, or other types of fluids as described above. In addition, when conventional seismic reflection boundaries 18 exist between subsurface formation 16 and the surface, seismic reflections may occur and may be detected by seismic sensors 20.

Near-surface formation 24 represents a subsurface formation at or near the surface of the Earth. Near-surface formation 24 may, for example, represent a water table or other porous rock layer. Seismic signals 20 may interact with fluid in pores of near-surface formation 24. As a result, charges within the pore may be modified. The pore may, for example, contain fresh water as is present in the water table. The resulting modification of the charges may generate an alternating current field, which may lead to the emission of electromagnetic signals 22 through the seismoelectric effect.

Electromagnetic sensors 26 represent any suitable combination of sensing elements capable of detecting and/or measuring at least some portion of electromagnetic signals 22. Electromagnetic sensors 26 may be communicatively coupled to computing system 30 and/or configured to output detected signals to computing system 30. In some embodiments, sensors 26 may be configured to detect and/or isolate the vertical component of the electromagnetic signals 22. As noted above, electromagnetic signals 22 may be emitted above the surface of the earth as a detectable electromagnetic field. It should also be noted that an electromagnetic field generally includes an electric field and a magnetic field. Accordingly, electromagnetic sensor 26 may be capable of detecting electromagnetic signals 22, an electric portion of electromagnetic signals 22, and/or a magnetic portion of electromagnetic signals 22. In some embodiments, electromagnetic sensor 26 may represent a magnetic field detector capable of detecting a magnetic field. In some embodiments, electromagnetic sensors 26 may be configured to attenuate and/or reject horizontal electromagnetic signals.

Electromagnetic sensors 26 may be arranged in an array and/or in a variety of patterns. Any appropriate number of electromagnetic sensors 26 may be arranged in the array or pattern. For example, an array of electromagnetic sensors 26 may include anywhere from two to thousands of sensors. In some embodiments, electromagnetic sensors 26 may represent a set of sensors that includes one or more magnetic field detectors, one or more electric field detectors, and one or more electromagnetic field detectors, which may be used in particular locations for passive surveying. The array may be configured to dispose electromagnetic sensors, such as sensor 26a and 26b, separated by any appropriate lateral distance. For example, sensor 26a and 26b may be located anywhere between several inches to several miles apart.

Sensors 26 may comprise any type of sensor capable of measuring the vertical electric field component of electromagnetic signals 22 in the near surface 24 of the Earth. In some embodiments, additional or alternative signals may also be measured including the background vertical portion of electromagnetic signals 14, the passive electromagnetic source 12 of electromagnetic radiation, one or more components of the magnetic field, one or more horizontal components of the electromagnetic signal and/or one or more components of the seismic amplitude. In some embodiments, one or more electromagnetic field detectors may be configured to measure a horizontal component of the earth's electromagnetic field in one or more dimensions. For example, sensors 26 may include electrode pairs disposed in a horizontal alignment to measure one or more horizontal components of electromagnetic signals 22 and/or electromagnetic signals 14. In some embodiments, sensor 26 may be configured to measure multiple components of electromagnetic signals 22 and/or 14. For example, sensor 26 may represent a two-axis electromagnetic field detector and/or a three-axis electromagnetic field detector.

Figure 2C:
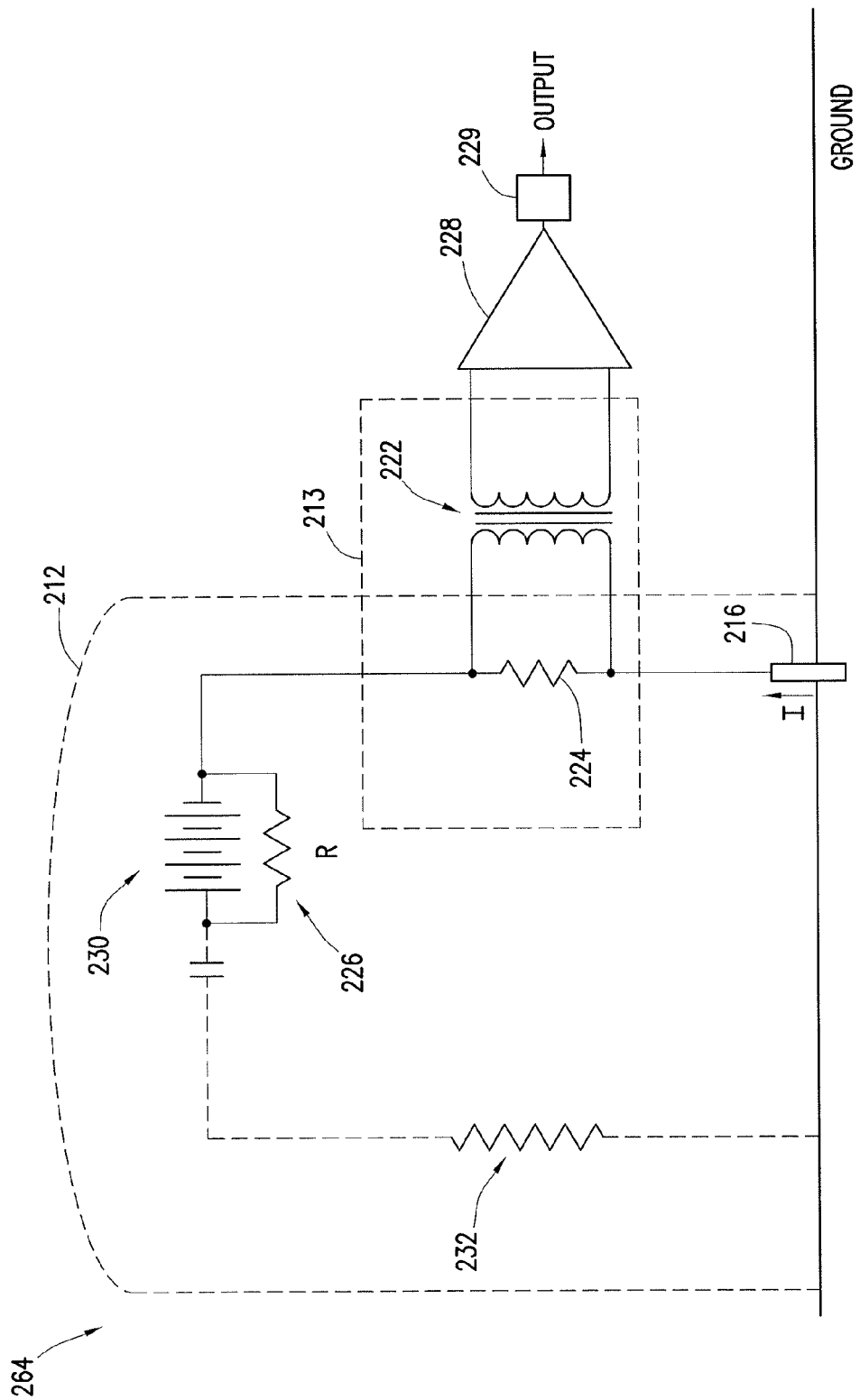

Sensors 26 may be disposed above the surface of the Earth and/or within the Earth. In some embodiments, sensor 26 may be placed at or on the surface of the Earth or at any distance above the surface of the Earth. For example, electromagnetic sensors 26 may be disposed anywhere from one to one hundred feet above the Earth, depending on the relative amplification capabilities of sensors 26 and the attenuation of electromagnetic signals 22. In some embodiments, sensors 26 may be disposed above and/or below the water table, above and/or below subsurface earth formation 16, and/or any appropriate combinations of locations and depths. Sensors 26 may be maintained in one location during a detection period of particular electromagnetic signals 22 and/or may be subsequently moved to provide another detection period. Additionally or alternatively, a plurality of sensors 26, such as an array, may be used to provide multiple simultaneous measurements at multiple locations. For example, electromagnetic sensors 26 may be disposed within a wellbore. Alternatively or in addition, an array of electromagnetic sensors 26 may be disposed in the area above and/or surrounding the wellbore to facilitate drilling operations and/or exploration of drilled fields. A more detailed discussion of an example operation of such embodiments is discussed below with respect to FIG. 7. More detailed examples of sensors 26 are illustrated in FIGS. 2A, 2B, and 2C.

Seismic sensors 28 represent any suitable combination of sensing elements capable of detecting and/or measuring at least some portion of seismic signals 20. For example, sensors 26 may be configured to detect the vertical component of seismic signals 20. Seismic sensors 28 may be communicatively coupled to computing system 30 and/or configured to output detected signals to computing system 30. Seismic sensors 28 may include, but are not limited to, geophones, hydrophones, and/or accelerometers, including digital accelerometers. Sensors 28 may represent a single-component geophone, a two-component geophone, or a three-component geophone. Sensors 28 may also represent a single-axis accelerometer, a two-axis accelerometer, or a three-axis accelerometer. In some embodiments, seismic sensors 28 may represent one or more three-component accelerometers. Additionally or alternatively, sensors 28 may represent any appropriate combinations of these types of seismic sensors. For example, multiple types of sensors 28 may be utilized by system 10 to detect seismic signals 20. Seismic sensors 28 may measure a seismic wave in multiple directions, for example in one or two directions parallel to the surface of the earth, in a direction perpendicular to the surface of the earth, and/or in a vertical direction.

Seismic sensors 28 may be arranged in an array and/or in a variety of patterns. For example, seismic sensors 26 may be arranged and/or located in similar manners and locations as discussed above with respect to sensors 26. Any appropriate number of seismic sensors 28 may be arranged in the array or pattern. For example, seismic sensors 28 may be arranged in a similar manner as discussed above with respect to electromagnetic sensors 26. As another example, a grid pattern may be used. Seismic sensors 28 may be laterally spaced apart by less than about one half of the wavelength of the highest frequency surface seismic waves expected to be detected. That may include higher frequencies than those expected to be produced by the electroseismic effect within the subsurface earth formation. Seismic sensors 28 may be configured to attenuate and/or reject surface and/or horizontal seismic signals. Such signals may be caused by various sources including heavy equipment, vehicular traffic, and/or natural sources such as earthquakes and/or thunder.

In some embodiments, a pattern and/or array of electromagnetic sensors 26 may overlap with a pattern or array of seismic sensors 28. Signals detected by sensors 26 and/or 28 may be transmitted to computing system 30. In some embodiments, the signals may be suitably recorded, for example, using a conventional seismic field recorder. Additionally or alternatively, each sensor may have its own recording device, and each recording device may be internal or external to the seismic sensor. It should be noted that while illustrated as including sensors 26 and 28, system 10 may include only sensors 26 or only sensors 28 as appropriate for particular embodiments. Accordingly, any appropriate combination of sensors 26 and/or sensors 28 may be utilized.

Sensors 26 and/or 28 may form all or a portion of a long-term installation, which may be utilized for long-term passive surveying. Signals 20 and/or 22 may be detected at multiple times over a period of time, which may be periods of days, weeks, months, or years. Long-term surveys may provide a time-based indication of various properties of subsurface earth formation 16, including any changes in the formation over the time period in which the signals are detected. System 10 may thus be used to monitor the development and/or depletion of a hydrocarbon field and/or water well or aquifer over periods of production.

Computing system 30 represents any suitable combination of hardware, software, signal processors, and controlling logic to process, store, and/or analyze electromagnetic signals 22 and/or seismic signals 20 received from sensors 26 and/or 28. Computing system 30 may include one or more processors, memory, and/or interfaces. Computing system 30 may, for example, include an interface operable to communicatively couple with and/or receive information from sensors 26 and/or 28. Computing system may be operable to receive and/or process passive survey data from sensors 26 and 28. Passive survey data may include, for example, data representative of signals 20 and/or 22. Computing system 30 may include one or more appropriate analog-to-digital converters to digitize signals 20 and/or 22 for digital signal processing. Alternatively or in addition, sensors 26 and/or 28 may include appropriate analog-to-digital converters. Computing system 30 may include a recording and/or storage device operable to receive and store data received from sensors 26 and 28. Computing system 30 may include, for example, digital and/or analog recording devices and/or non-transitory media. In some embodiments, computing system 30 may be capable of processing detected seismic signal 20 and the detected electromagnetic signal 22 in real-time without first recording the signals on a non-transitory medium.

Computing system 30 may form all or a portion of a recording vehicle, a housing structure, or a weather resistant enclosure located proximate sensors 26 and/or 28. In some embodiments, computing system 30 may be at least partially enclosed in a weather-resistant enclosure. Accordingly, computing system 30 may be capable of recording passive survey data over days to weeks without human intervention. As shown below with respect to FIGS. 4-6, a computing system 30 may be enclosed in a dedicated recording vehicle. Moreover, while illustrated as external to sensors 26 and/or 28, computing system 30 may be internal or external to a housing of one or more sensors 26 and/or 28. Moreover, computing device 30 may be one of a plurality of computing devices 30 used to record one or more electric and/or seismic signals. Computing device 30 may be capable of communicating with other computing devices 30 or other data processing servers over a network (not illustrated). The network may be a wired or wireless communications network. Thus, any of the data processing techniques described herein may be performed by one or more computing devices 30 and/or may be performed by a remote data processing server, which may be capable of processing and correlating data from various computing devices 30. An example embodiment of computing system 30 is discussed in more detail below with respect to FIG. 9.

As illustrated in FIG. 1B, passive seismic source 40 represents any appropriate passive source of seismic energy. For example, passive source 40 may represent the earth's natural seismic energy. Passive source 40 propagates seismic energy into the subsurface of the earth as seismic signal 42. Seismic signal 42 may represent, for example, a seismic plane wave 42. As seismic signal 42 propagates into the earth, it may encounter various subsurface earth formations 16. The interaction of seismic signal 42 and subsurface earth formation 16 may cause a seismoelectric conversion to take place at an edge and/or boundary 18 of subsurface formation 16. As a result, one or more electromagnetic signals 22 and/or seismic signals 20 may propagate towards the surface of the earth. Electromagnetic signal 22 may be generated as a result of a seismoelectric conversion as seismic signals 20 propagate towards the surface. Electromagnetic sensors 26 may detect electromagnetic signals 22. Seismic sensors 28 may detect seismic signals 20. In some embodiments, seismic sensors 28 may detect seismic signals 40, which may be used as a reference to detect a modulation of signals 20 and/or 22 by subsurface earth formation 16.

Passive seismic source 40 may represent earth's naturally occurring seismic energy. Earth's naturally occurring seismic energy may include a broad spectrum of frequencies, from sub-hertz frequencies to tens of thousands of hertz frequencies, having a broad coverage over the surface of the earth. This broad spectrum allows for a broad range of penetration depths of seismic signal 42 from tens of meters to tens of kilometers. The corresponding frequencies of seismic signal 42 in the earth may result from variations in passive source 40 due to various natural events such as Earth quakes, tides, tectonic events, volcano activity, thunder, and atmospheric pressure fluctuations. In some embodiments, passive source 40 of seismic signals 42 may include cultural sources of seismic waves, which may have sufficiently low frequencies to reach and interact with subterranean formation 16. As another example, passive source 40 may include well-drilling activities, pumping fluids, automobile noise, compressor noise, farming noise, and manufacturing noise, which may generate seismic signals 42 of appropriate strength and/or frequency to interact with subterranean formation 16.

FIG. 1B includes several examples of passive seismic source 40, including passive seismic sources 40a-40e. Passive seismic source 40a may represent a source of seismic energy resulting from a drilling operation. Passive seismic source 40a may represent a localized drilling event at a particular depth (such as, for example, the head of a drill bit or drilling apparatus interacting with the subsurface) and/or may represent vibrations from drilling activities along a length of the hole and/or casing. Passive seismic source 40b may represent a source of seismic energy resulting from horizontal drilling activities such as fracturing, hydrofracturing, or other drilling operations. Additionally or alternatively, passive seismic source 40b may represent seismic energy caused by fluid is moving through rock pore spaces (which may be the result of hydrofracturing). Passive seismic sources 40c and 40d may represent sources of seismic energy resulting from the Earth's natural seismic activity and/or a microseismic or other natural event, as described above. Passive seismic source 40b may represent a source of seismic energy resulting from a near-surface or surface event. Accordingly, passive seismic source 40 may include any appropriate source of seismic energy and/or may be located in any appropriate relationship to subsurface earth formation 16, including above, below, beside, or in subsurface earth formation 16. Additionally or alternatively passive seismic source 40 may include seismic energy caused by a drill bit, fracturing rock, fluid moving through rock pore spaces, wells where drilling or pumping activity occurs, and/or by pollutant fluids migrating through the subsurface.

Seismic signal 42 represents a seismic wave, seismic plane wave, or other appropriate seismic signal that propagates into the Earth from passive source 40. Accordingly, seismic signal 42 may emanate from any appropriate passive seismic source 40, including those originating at the Earth's surface and/or located at some appropriate depth below the surface. For example, seismic signals 42a-42e may respectively originate from passive seismic sources 40a-40e. It should be understood that the various signals illustrated in FIGS. 1A and 1B are depicted in different figures for the sake of clarity only. Accordingly, particular embodiments of system 10 may be capable of utilizing signals 20 and/or 22 prorogated by passive electromagnetic source 12 and/or passive seismic source 40. Moreover, system 10 may be configured to utilize signals 20 and/or 22 from passive electromagnetic source 12 at particular times while utilizing signals 20 and/or 22 from passive seismic source 40 at particular other times and/or may utilize the signals at the same time. For example, passive electroseismic/seismoelectric surveying utilizing passive seismic sources 40 and/or passive electromagnetic sources 12 may be collected during drilling or fracturing or enhanced oil recovery to acquire information about hydrocarbons and/or other fluids. Survey data from passive electromagnetic sources 12 may be collected, for instance, when passive seismic sources 40 are attenuated. For example, the drilling operation may be paused and/or finished. As another example, computing system 30 may perform passive surveying during drilling, fracturing, and/or enhanced oil recovery to acquire information about hydrocarbons and/or other fluids.

In operation, system 10 detects, stores, and/or analyzes electromagnetic signals 22 and/or seismic signals 20. Sensors 26 and 28 respectively may detect electromagnetic signals 22 and seismic signals 20. Each sensor may transmit the detected signals to computing device 30 for storage and/or processing. Computing device 30 may record the resulting electromagnetic signals 22 and/or seismic signals 20. Computing device 30 may process electromagnetic signals 22 and/or seismic signals 20 to identify various properties associated with subsurface formation 16. Sensors 26 and/or 28 may additionally or alternatively detect signals generated by subsurface earth formation 16 in response to a electromagnetic signal 42 propagated from passive seismic source 40. Computing system 30 may then process detected signals using various signal processing techniques to identify properties and/or features of subsurface earth formation 16. Thus, the techniques discussed in the present disclosure may be utilized to analyze signals 20 and/or 22 generated as a result of passive electromagnetic source 12 and/or passive seismic source 40. Certain examples of the operation of system 10 provided below may be discussed with respect to a passive electromagnetic source 12, but it should be noted that the teachings of the present disclosure apply similarly and/or the same to signals generated by passive seismic source 40.

System 10 may process the signals to determine the existence of a fluid in subterranean formation 16 and/or other properties of the subterranean formation, such as the existence of subsurface earth formation 16 and/or an indication that it contains a fluid, a depth of subsurface earth formation 16, a porosity of subsurface earth formation 16, a fluid permeability of subsurface earth formation 16, a composition and/or type of at least one fluid within subsurface earth formation 16, a spatial extent of the subsurface earth formation 16, an orientation of the boundaries of the subsurface earth formation 16, a resistivity of subsurface earth formation 16, or any combination thereof. Fluids detectable and/or identifiable by system 10 may include an aqueous fluid (such as water), a hydrocarbon, petroleum, carbon dioxide, carbon monoxide, acid gases, helium, nitrogen, other subsurface minerals. System 10 may also be capable of identifying and/or tracking migration of fluids, pollutants, magma, and other subsurface fluids.

System 10 may be moved during a measurement to detect signals 20 and/or 22 at multiple locations. Thus, system 10 may be capable of generating and analyzing passive survey data across large survey areas. Moving system 10 may provide useful information for a screening or first look at an area of interest. In some embodiments, the system 10 may be disposed in a moving vehicle. For example, sensors 26 may be installed in a pattern into a movable device to facilitate movement of the array. For example, sensors 26 may be disposed in a trailer, rack, or cargo carrier connectable to a moving vehicle such as a truck or van. Sensors 26 may alternatively be installed in a land vehicle, water vessel, or aircraft. System 10 may record and/or store signals 20 and/or 22 detected by sensors 26 and/or 28, as described in more detail herein. In some embodiment, system 10 may continuously and/or repeatedly detect signals 20 and/or 22 while moving.

Computing system 30 may record signals 20 and/or 22 over various periods of time as appropriate. Computing system 30 may utilize sampling techniques to ensure an adequate representation of the detected signals. A minimum sampling rate may be determined based on the frequency of the sampled signals. In general, the sampling rate for the analog-to-digital conversion should be at least twice the highest frequency of interest in order to properly represent the recorded waveform. However, higher order sampling may be utilized, including various oversampling techniques. Longer recording times may allow for better signal to noise ratios (SNRs) and may accordingly increase reliability of the detected signals.

Computing system 30 may process detected signals 20 and/or 22 to determine particular properties of the subsurface earth formation, including any one or more of the properties discussed above. Computing system 30 may process the signals at substantially the same time as the time the signals are detected and/or may store the signals to process the signals at a later time. Computing system 30 may be configured to apply various digital signal processing techniques to the detected signals. For example, computing system 30 may apply a series of pre-processing steps to the detected signals, including applying various filtering techniques calculated to remove noise and/or isolate signals of interest from the detected signals. After pre-processing, computing system 30 may determine from the processed data various properties of subsurface earth formation 16. Computing system 30 may, for example, correlate the processed data to identify properties of subsurface earth formation 16. Each of these steps are discussed in greater detail below.

Pre-Processing of Detected Signals 20 and/or 22

Computing system 30 may apply various pre-processing techniques to data received from sensors 26 and/or 28 in order to identify and/or isolate signals 20 and/or 22 from other sources of electromagnetic signals that may be received by sensors 26 and/or 28. For example, to isolate electromagnetic signals 22, computing system 30 may apply a noise reduction scheme utilizing a generated reference signal that is detected and/or demodulated to identify and/or isolate electromagnetic signals 20. Computing system 30 may also apply other noise reduction techniques, such as isolation of direct current components of the signal, digital sampling techniques, and analog and/or digital band-pass filtering.

Coherent noise refers to cyclic signals 20 and/or 22 that have an approximately constant frequency over a predetermined measurement period. Many coherent, electromagnetic noise sources can be found in a typical measurement setting and can be accounted for through various processing techniques. For example, the power-line frequency of 60 Hertz (Hz) can generate a high amplitude electromagnetic signal that can propagate into the earth, where the resulting amplitude at the one or more electromagnetic sensors 26 may be hundreds or thousands of times larger than the desired background electromagnetic field within the earth. Similarly, unbalanced power-lines can generate 180 Hz noise and motors can generate 400 Hz noise. As a further example, cathodic protection circuits can produce poorly-rectified alternating current (AC) signals at several frequencies that result in electromagnetic noise at the one or more electromagnetic sensors 26.

Computing system 30 may apply various noise reduction techniques, including a technique that may utilize a generated reference signal that is demodulated to identify and/or isolate electromagnetic signals 22. The noise reduction scheme may be used to generate a signal that may have an increased signal-to-noise ratio relative to the full spectrum of the electromagnetic field 14. For example, a reference signal may be generated by a reference signal generator and introduced into the near surface 24 of the Earth. The reference signal generator may transmit the reference signal into the earth from a location near to the ground. Electromagnetic signals 22 may modulate the reference signal in the same way as the vertical portion of electromagnetic signals 22. Upon detecting the modulated reference signal with sensor 26, computing system 30 may then compare the detected signal with the known reference signal and isolate electromagnetic signals 22 for further processing. The detected, modulated reference signal may, in some embodiments, be filtered or otherwise pre-processed prior to being compared and isolating electromagnetic signal 22. For example, a lock-in amplifier may be used to isolate electromagnetic signal 22 from the detected signal. The reference signal generator may be coupled to the lock-in amplifier 804 or may form a part of the lock-in amplifier. The reference signal and the detected modulating signal may be input to the lock-in amplifier. The lock-in amplifier may produce a signal comprising electromagnetic signal 22 with an improved signal-to-noise ratio as compared to the signal detected by the sensor 26. The existence of a modulation of the reference signal may be taken as an indication that a coupling has occurred due to the interaction of the reference signal with electromagnetic signals 22. Electromagnetic signals 22 may then be isolated based on the fact that electromagnetic signals 22 may have narrower frequency-band spectrum than the reference signal and/or may have recognizable and extractable characteristics. The produced signal may then be sent to one or more additional, optional pre-processing steps before being passed on for further analysis.

Depending on the type of sensors 26 and/or 28 used to detect the signal, electromagnetic signals 22 and/or seismic signals 20 may include an alternating current (AC) portion and direct current (DC) portion. The DC portion of the signal may result from the detection of one or more portions of the earth's electromagnetic field 14 and may not be representative of electromagnetic signals 22 or seismic signals 20. Accordingly, the DC portion may represent noise that may be filtered out prior to analysis of signals 20 and/or 22. The DC portion may be filtered and/or removed using any appropriate techniques, such as using a capacitive filter or other elements of the sensor 26 and/or 28 design and/or using a digital filter implemented in software.

Digital sampling techniques including data decimation may be utilized to limit and/or filter the data to be processed. Decimating may refer to any appropriate technique for reducing the effective sampling rate. To the extent appropriate, decimation may reduce the amount of data that is processed in the analysis steps, which may reduce processing times. The signal data may typically be decimated down to an effective sampling rate approximating two times the highest frequency of interest while allowing for an identification of the frequency characteristics in the data. Higher decimation rates may be used, for example, when a faster, and possibly less accurate first look at the data is desired. In some embodiments, the signals 20 and/or 22 may be oversampled and/or averaged over one or more frequencies and/or frequency ranges to reduce the effects of momentary fluctuations in the electromagnetic field 14 and/or signals 20 and/or 22. For example, signal amplitude may be selected to be averaged by computing system 30 at one or more fixed frequencies present in the detected seismic signal 20 and/or electromagnetic signal 22. It should also be noted that seismic signals 20 may require certain characteristic propagation times for a seismic wave that originates at subterranean earth formation 16 to reach the Earth's surface. The averaging process may include identifying the characteristic times of seismic propagation from the subterranean formation. The averaging process may include measuring and/or sampling the signal amplitude for a length of time, which may be more than twice the period of oscillation, and averaging the signal amplitude over the detection time period.

Various filtering techniques may be utilized to isolate signals 20 and/or 22, reduce noise, and/or increase SNR. For example, signals 20 and/or 22 may be filtered with a band-pass filter to isolate one or more frequency bands of interest. Noise may be filtered using a high pass filter, a low pass filter, wide band frequency filter, and/or narrow band frequency filter, or other appropriate noise filter. In some embodiments, ambient and/or naturally occurring sources of electromagnetic radiation, such as electromagnetic signals 14 and/or passive electromagnetic source 12, may be used to determine the frequency range, amplitude range, and/or other parameters of a desired noise filter.

Coherent noise sources may not have exactly constant frequency over a predetermined measurement period. These imperfections may be due to phase changes in the coherent noise sources. For example, electromagnetic noise generated by power lines can experience some variations in the power-line voltage. Computing system 30 may monitor the phase of the coherent noise source to adjust the start times to correspond to the phase of the coherent noise for each interval. The coherent noise source may also experience amplitude variations over time, which may result in a partial cancellation of the coherent noise upon the summing of the intervals. In an embodiment, computing system 30 may apply a frequency filter, such as a frequency notch filter, to the detected electromagnetic signals 22 to further enhance the signal-to-noise ratio and/or reduce a portion of the coherent noise in the background electromagnetic field.

The techniques used to remove at least a portion of coherent noise from the detected electromagnetic signals 22 may also be applied to the detected seismic signals 20. Various sources of coherent seismic noise may be present in a typical measurement setting, including for example, motor noise and industrial equipment. It should be noted that the start time and duration for each corresponding interval of both the detected electromagnetic signals 22 and the detected seismic signals 20 may be the same to improve cross-correlation of the signals. In some embodiments, the start time and duration may be chosen to allow cancellation of at least a portion of the coherent noise in both the detected electromagnetic signals 22 and the detected seismic signals 20.

Horizontal components of electromagnetic signals 22 and/or seismic signals 20 may be rejected in any appropriate manner. For example, multiple electromagnetic sensors 26 may be disposed in an array and may be used to detect one or more horizontal and/or vertical components of the electromagnetic signal 22. Similarly, horizontal seismic noise may also be rejected in detected seismic signals 20. In particular, detected seismic signals 20 may be filtered in the spatial domain to reject surface waves traveling horizontally across seismic sensors 28. One or more seismic sensors 28 may be configured to measure a horizontal component of seismic signals 22, which may be used to generate the horizontal components used in the spatial filter. Accordingly, a horizontal component of electromagnetic signal 22 and/or seismic signal 20 may be used as a predictive filter to remove noise from the vertical component of the electromagnetic signal 22 and/or seismic signal 20. The predictive filter may utilize horizontal components detected by one or more electromagnetic sensors 26 and/or sensors 28.

Spatial filters may also be applied to reject local seismic noise that may be detected by seismic sensors 28. In some embodiments, local noise waves may propagate across the plurality of seismic sensors 28 in expected spreading patterns, which may be analogous to water waves on a pond. The propagating noise waves may be suppressed by determining the direction of travel and speed, and applying a spatial filter that makes use of the spreading symmetry of the noise wave. The spatial filter may remove the local noise from seismic signals 20 detected by each sensor 28. In some embodiments, a predictive filter may be employed to predict the arrival and amplitude of the local noise wave at a seismic sensor and remove the local noise wave during the generation of the detected seismic signal 20. As noted above, one or more of seismic sensors 28 may be configured to measure a horizontal component of the seismic wave. These seismic sensors 28 may also be used to determine the spreading geometry of the local noise wave. The spatial filter may then be applied to each of the plurality of seismic sensors 28, including those that may not be configured to measure a horizontal component of the seismic wave. In some embodiments, one or more additional seismic sensors 28 used for local noise rejection may be deployed at a distance away from the seismic sensors 28 measuring seismic signals 20. The ability to measure the local noise wave at a distance from other seismic sensors 28 may provide better prediction of the local noise wave and an improvement of the reduction of the local noise wave in the detected seismic signal.

To enhance spatial continuity across seismic sensors 28, seismic signals 20 detected by multiple seismic sensors 28 may be cross-correlated and/or summed. Summed seismic signals 20 may be used as a predictive filter to enhance spatial continuity. Summed seismic signals 20 may result in an increase in the amplitude of the seismic waves arriving at the same time, for example, from a plane wave. Summed seismic signals 20 may tend to cancel sources of local noise and/or components of seismic signals 20 that are not traveling as a plane wave. In some embodiments, a dip filter may be utilized to reject noise. For example, the fact that the seismic signals 20 resulting from one or more electroseismic conversions may be a plane wave may be used to remove at least a portion of a noise signal from the detected seismic signal 20. In particular, a dip filter can be used to reject detected seismic signals 20 arriving at a non-normal angle to the seismic sensors 28. In some embodiments, the dip filter may be applied after cross-correlating the detected seismic signals from two or more of the seismic sensors.

Processing Signals 20 and/or 22

After any of the above optional pre-processing steps are performed, the resulting filtered signals 20 and/or 22 may be processed to determine one or more properties of subsurface earth formation 16. Processing may include extracting an envelope of the filtered signals 20 and/or 22, applying various frequency-domain processing and/or analysis steps, and other processing techniques as explained in more detail below. The existence of hydrocarbons in a formation may be indicated by the existence of a modulation in signals 20 and/or 22. In terms of the signal analysis described in this section, the modulation may be identified by computing system 30 by demodulating a portion of the detected signals 20 and/or 22 to determine if an envelope can be identified. If no envelope is found that is distinguishable from white noise, for example, or some other suitable reference signal, then this result may be taken as evidence that there are no hydrocarbons in subsurface formation 16. If a suitable envelope is identified, then the analysis described herein may be carried out to identify the spectral properties of the envelope and correlate the results with the presence of various fluids as well as a time and/or frequency-depth function. In some embodiments, other surveys as described below may be performed when an envelope is identified.

Pre-processed signals 20 and/or 22 may pass to a signal envelope extraction step in which computing system 30 determines an envelope of the signal in the band of interest. The envelope of the signal may refer to the shape of the modulation of the signal. The modulation, and therefore the envelope, can comprise one or more of a frequency modulation, a phase modulation, or an amplitude modulation. An envelope detector used to extract the envelope of the signal may be implemented in hardware or software. The envelope detector may demodulate signals 20 and/or 22 to determine and/or extract the signal envelope. Various demodulation techniques may be used to extract the signal envelop, including the Hilbert transform method.

If a signal envelope has been obtained, computing system 30 may analyze the envelope to calculate one or more spectral properties. Spectral properties may include amplitude and frequency characteristics of a signal and/or envelope, as well as other characteristics of the signal and/or envelope, such as phase characteristics. Determination of spectral properties may allow computing system 30 to compare the envelope with one or more additional envelopes for additional signal bands. Spectral properties may be determined in the frequency domain by calculating the Fourier Transform and/or power spectral density. For example, the power spectral density for various bands of frequencies may be calculated to give the power carried by the envelope expressed in units of power per frequency. Alternatively or in addition to the power spectral density, a Fourier Transform (FT), such as a Fast Fourier Transform (FFT) and/or complex FFT, may provide an indication of various frequency characteristics of the envelope, including the frequency distribution. Furthermore, the power spectral density and FT calculations may provide relative amplitudes of each of the frequencies identified. Calculation of the spectral properties may be implemented in hardware and/or software. In some embodiments, computing system 30 may determine one or more of spectral properties using a lock-in amplifier and/or a spectrum analyzer.

Once spectral properties have been calculated, computing system 30 may compare corresponding values in certain frequency bands to the corresponding spectral properties in other frequency bands. Based on the comparison, computing system 30 may generate one or more ratios of the spectral properties, such as ratios of power spectral densities, FFT amplitudes, and/or phases. A particular detected signal 20 and/or 22 that includes various white noise portions may be used as a base set of spectral properties that may be used as a basis for comparison. For example, the base spectral properties may be used to normalize other calculated ratios. It should be noted, however, that other mathematical transformations may be used to produce similar results.

Computing system 30 may analyze and correlate the ratios of spectral properties as a function of the band-pass frequencies of the original signals 20 and/or 22 and/or as a function of the frequency band of the extracted envelopes. Based on the analysis, computing system 30 may determine information about the frequency characteristics of the modulating signal and/or an amplitude correlation relating the strength of the modulating signal for each frequency. Variations within the analysis may be used as feedback to adjust the analysis criteria such as increasing the bandwidth of the band-pass filters, which may be expected to increase the amplitude of the ratio of the power spectral properties. The properties of the analysis may be tailored based on the quality and amount of data obtained, the type of signals present and interacting with a formation of interest, and a desired processing speed and cost.

Computing system 30 may process the obtained power spectral density by de-trending the power spectral density and/or integrating the power spectral density. Computing system 30 may then perform a correlation analysis of the detected electromagnetic field in the time domain, the frequency domain, or both. For example, after de-trending and integration, computing system 30 may determine a FT of the power spectral density. The FT of the power spectral density may yield correlations between the source electromagnetic field 14 and secondary electromagnetic fields 22 generated by seismic signals 20 by the seismoelectric effect in near-surface formation 24. The properties of the analysis may be tailored based on the quality and amount of data obtained, the type of signals present and interacting with a formation of interest, and a desired processing speed and cost. In such embodiments, computing system 30 may determine the existence of hydrocarbons in subsurface earth formation 16 may be indicated based on the existence of strong correlations between the source electromagnetic signal 14 and the secondary electromagnetic signals 22 generated by seismic signals 20 through the seismoelectric effect in near-surface formation 24. Seismic signals 20 may be generated by electroseismic effects at subsurface earth formation 16 at correlation times that may correspond to known seismic transit times between hydrocarbon formations and the surface of the earth. Seismic transit times can be obtained explicitly from seismic data obtained in the area of interest or can be estimated based on rock acoustic properties.

Correlation of the spectral properties of the envelope and the presence of various fluids in subterranean pore spaces may be based on a variety of classification methodologies. For example, statistical regression analysis, and statistical classifiers such as neural networks, decision trees, Bayes-based classifiers, fuzzy logic-based classifiers, and conventional statistical classifiers may all be used to determine a time-depth and/or frequency-depth relationship. For example, the analysis may be performed with the system and methods described herein at locations with known properties and formation characteristics to train and/or determine the correlation parameters. Once the parameters have been determined, such as through adequate training to a neural net, computing system 30 may repeat the analysis in a new location.

Additionally or alternatively, computing system 30 may perform power spectral analysis and obtain relative power ratios of the modulating signal 20 and/or 22 relative to a background signal to determine the frequency characteristics of the modulating signal. The time and/or frequency characteristics may be used to derive depth and location information about the source and strength of the modulating signal, thereby revealing information about the location and/or depth of a subsurface earth formation 16. A variety of models may be used to correlate the spectral analysis results with the depth of the modulating signal. For example, depth of the subsurface formation 16 may be determined based on a time depth function and/or frequency depth function. While a correlation generally exists between the frequency of modulating signals 20 and/or 22 and the depth at which those signals originate, the exact correlation may or may not be evident from the analysis of the signal detected by sensors 26 and/or 28. Accordingly, a time-depth and/or frequency-depth function may be established using known or predetermined locations, parameters, and/or calculations. The depth values for similar locations may be determined based on those predetermined characteristics once the spectral characteristics of the signals are analyzed and determined. The time-depth and/or frequency-depth relationship for signals 20 and/or 22 may depend on the Earth's resistivity, formation properties, types of components present, and/or various electrical properties of a particular geologic area. Accordingly, new and/or modified time-depth and/or frequency-depth functions may be determined and/or applied as computing system 30 is moved from location to location. In some embodiments, a time-depth and/or frequency-depth function for one area may provide an adequate estimate for another area depending on the relative characteristics of those areas. Time-depth and/or frequency-depth functions may be derived from pre-existing empirical data obtained from previous geophysical surveys and/or exploration. Other suitable sources of data to determine a frequency-depth function may be considered, such as conventional skin effect conductivity analyses. Based on a time-depth and/or frequency-depth function and particular signals 20 and/or 22, computing system 30 may derive depth information associated with subsurface earth formation 16.

Techniques for Identifying Particular Properties

Computing system 30 may utilize various correlation techniques, which may be used to identify particular properties of subsurface formation 16. In some embodiments, passive surveying may be carried out by sequentially detecting and/or separately processing electromagnetic signals 22 and seismic signals 20. For example, the detection of both electromagnetic signals 22 and seismic signals 20 may occur at different times and/or locations. In some embodiments, detection may occur during overlapping time periods and/or at the same locations. The two types of signals may be cross-correlated to determine various properties of the subsurface earth formation 16.

Cross-correlation, which may also be referred to as joint processing, may be used to identify features in common to data from both signals. For example, electroseismic and seismoelectric signals may originate in the same physical conversion mechanism at boundaries 18 between dissimilar rocks or at boundaries 18 between different fluids in rock pore spaces. Sensors 26 and 28, however, may not be equally sensitive to rapid signal changes or to small signal amplitude differences. Thus, the processed electromagnetic signals 22 and seismic signals 20 may be similar but may not be identical. Cross-correlation by computing system 30 may enhance and/or isolate the common information in both data sets. Cross-correlation may be carried out at a variety of points in the analysis of each signal as described above with respect to the processing of electromagnetic signals 22 and seismic signals 20, either together or individually.

In some embodiments, computing system 30 may cross-correlate the detected electromagnetic signals 22 with the detected seismic signals 20 to isolate at least a portion of the detected seismic signal 22. For example, electroseismic conversion may generate a seismic response to a time-dependent electromagnetic field with a corresponding time dependence. Accordingly, the resulting seismic signals 20 may have the same time-dependence as the electromagnetic signals 14, delayed by the seismic travel time. Electromagnetic signal travel time may be neglected because the electromagnetic propagation time down to the reservoir may be much shorter than the seismic travel time to the surface. This result may be used to remove at least a portion of a noise signal that does not possess the expected time dependence between the detected electromagnetic signals 22 and the detected seismic signals 20.

One or more harmonic signals may be detected and/or isolated in the detected seismic signal using a variety of methods. In some embodiments, the detected seismic signal may be cross-correlated with the detected electromagnetic field. A frequency analysis of the data resulting from the cross-correlation may be used to identify frequencies in the detected seismic signal that are higher than those present in the detected electromagnetic field. The frequencies present in the detected electromagnetic signal 22 may then be used to remove at least a portion of the corresponding frequencies, including fundamental frequencies, from the detected seismic signal 20 using, for example, filtering techniques as is discussed above. The frequencies may also be utilized by computing system 30 to detect and/or isolate one or more of the harmonic signals, which may include coherent harmonic signals.

Computing system 30 may, in some embodiments, detect and/or isolate the harmonic signals by partially rectifying the detected seismic signal 20 and/or the harmonic signals detected and/or isolated from the detected seismic signal 20. The harmonic signals may resemble a partially-rectified sine wave, which may be asymmetrical about zero amplitude. In some embodiments, the positive amplitudes may be larger than the negative amplitudes. The resulting asymmetry may be utilized by arbitrarily reducing the positive portions of the source waveform before cross-correlation. In some embodiments, the negative amplitudes may be larger than the positive amplitudes. The resulting asymmetry may be utilized by arbitrarily reducing the negative portions of the source waveform before cross-correlation. Signal measurement and processing may be used to determine which portion of the amplitude, such as the positive amplitude portion or the negative amplitude portion, if either, is larger. Any of the aforementioned pre-processing techniques may be applied before computing system 30 cross-correlates the detected harmonic signals in the detected seismic signal 20 with the detected electromagnetic signals 22 and/or one or more harmonic signals in the detected electromagnetic signals 22. An autocorrelation of the detected electromagnetic signals 22 may have lower frequency components than the autocorrelation of the detected seismic signals 20. In some embodiments, the detected seismic signal 20 may be band-pass filtered to remove frequencies below the fundamental frequencies present in the detected electromagnetic signals 22, which may be used to identify the harmonic signals. The filter may be applied before processing the detected seismic signal and the detected electromagnetic field. In some embodiments, the detected harmonic signals may be processed with the detected electromagnetic signals 22 to determine at least one property of the subsurface earth formation 16. In some embodiments, the processing of the detected harmonic signals with the detected electromagnetic signals 22 may comprise cross-correlating the detected harmonic signals with the detected electromagnetic signals 22.

Computing system 30 may detect and/or isolate one or more nonlinear signals using any appropriate technique. The nonlinear signals in the detected electromagnetic field, which may include harmonic signals, may result from the conversion of the electromagnetic energy in the earth's background electromagnetic field to seismic energy, as described in more detail above. This point of conversion may also result in a frequency shift or time delay in the electromagnetic energy in the earth's background electromagnetic field, generating nonlinear signals. At least a portion of the resulting nonlinear signals may be detected by the electromagnetic field detectors and used to determine at least one property of the subsurface earth formation.

In some embodiments, the interface 18 where electroseismic conversions occur can be modeled as a charged capacitor that comprises a planar region of high resistance and an existing, internal electromagnetic field. The interface can then be understood as having a resistor-capacitor (RC) time constant. The RC time constant may vary over a considerable range of values depending on the resistance of the rock interface 18 and the internal electric field. The RC time constant may have the effect of smoothing out a portion of the background electromagnetic field 14, which may be detected by one or more of the electromagnetic sensors 26. In some embodiments, the extent of the resulting smoothing of the background electromagnetic field 14 may be used during processing to determine at least one property of the subsurface earth formation. The background electromagnetic field 14 may be modified depending on the orientation of the background electromagnetic field 14 with respect to the interface 18. When the background electromagnetic field 14 is parallel to the internal electric field at the interface 18, the internal field and internal stresses may not be modified significantly. In this orientation, the interface 18 behaves as a simple resistor of high value with mobile fluids in the pore space, and the RC time constant may not significantly affect the background electromagnetic field 14. However, some of the electrical field energy may be converted into seismic energy in the electroseismic response.

When the background electromagnetic field 14 is antiparallel with respect to the internal field at the interface 18, the internal chemical reactions may be temporarily halted, the stresses and effective resistance may be reduced, and the net electric field may decrease. In this orientation, the applied field may be at least partially rectified to a reduced value and the change in internal stresses may produce a seismic response. In terms of the overall subsurface earth formation, the earth's background electromagnetic field may be at least partially rectified at the boundaries between rock masses. As a result, the earth's background electromagnetic field 14 that is interacting with a charged dipole layer where an electroseismic conversion occurs may be altered, and the alterations may be detected by one or more sensors 26 configured to detect background electromagnetic field 14. In some embodiments, the partial rectification of the background electromagnetic field 14 may be used to determine an orientation, resistivity, or both of at least one interface 18 in the subsurface earth formation 16. The apparent subsurface resistivity may depend on the background electromagnetic field's polarization. In one polarity of the background electromagnetic field 14, the conversion surface looks like a simple resistor. In the opposite polarity it appears to be a capacitor with a long RC time constant. This time constant may at least partially smooth out one polarity of the source signal, resulting in one polarity having an observable induced polarization while the opposite polarity may not. The degree of induced polarization may act as an indicator of the resistivity of the interface, and the determination of the polarity being affected may act as an indicator of the orientation of the rock interface.

The properties of the background electromagnetic field 14 may be spatially dependent, allowing for a determination of the lateral extent of the subsurface earth formation 16. The extent of the lateral variation in the induced polarization and generation of nonlinear signals may be smoothed out due of the long wavelengths present in the earth's background electromagnetic field 14. As a result, the detected electromagnetic field may have a limited resolution with respect to the edges 18 of the reservoir.

In some embodiments, low frequency measurements, such as frequency measurements below 1 Hz, earth's background electromagnetic field 14 may be useful in measuring the polarity dependence of the induced polarization. In the measurements of the seismic signals 20 resulting from the electroseismic conversions, the seismic wavelengths may be useful for spatial delineation and the seismic velocity may be useful for depth determination. In these measurements, frequency and time information may be important characterizations. In some embodiments, the frequency and time information may be determined by integrating the amplitudes of different polarities in the detected electromagnetic field and the detected seismic signal from one or more seismic sensors.

The nonlinear signals in the detected electromagnetic signals 22 resulting from the conversions at the subsurface earth formation interfaces may be detected using a variety of methods. In some embodiments, the positive and negative polarities of the earth's background electromagnetic field 14 may have different amplitudes and different frequency spectra after being affected by the interface. These differences may be used in determining the nonlinear components of the detected electromagnetic signals 22. The resulting linear electroseismic response may be detected from the detected seismic signal at one or more seismic sensors. Through a cross-correlation, the resulting linear components of the detected electromagnetic signals 22 may be determined and isolated by computing system 30. Using the linear components as a filter, the non-linear components may be isolated from the detected electromagnetic field. The filtered electromagnetic signals 22 may be further processed to identify the nonlinear components or reduce any noise signals present in the remaining detected electromagnetic field after being filtered. For example, additional filters may be applied and/or autocorrelations performed.

In some embodiments, the detected electromagnetic signals 22 may be compared to the earth's background electromagnetic field 14 measured at a distant location. The detected electromagnetic field may have harmonic frequencies and low frequencies that are not present in a signal measured at a distant point. In this embodiment, detected electromagnetic signals 22 at a distant electromagnetic sensor 26 may be used to filter the detected electromagnetic signals 22 above the subsurface earth formation 16. The remaining signal present after applying the filter may contain the various harmonic, nonlinear, and/or low frequencies of interest. These signals may be further processed or filtered, for example to remove one or more noise signals.

In some embodiments, any harmonic, nonlinear, and/or low frequencies present in the detected electromagnetic field above the subsurface earth formation of interest may be detected by comparing the detected electromagnetic field measured in the earth to those measured in the atmosphere. If the earth's background electromagnetic field 14 modulation creates a seismic response, then the surface where energy conversion occurs may behave as a source of electromagnetic radiation since there is a finite region of modulated electromagnetic field and charge separation. The earth's background electromagnetic field within the earth may itself take on a character reflecting the nonlinear conversion. The resulting electromagnetic radiation may manifest itself as a change in boundary conditions at the earth's surface. Specifically, the resulting electromagnetic radiation may create a vertical electric field that may not be continuous across the earth/atmosphere boundary. The use of a detected electromagnetic field above the surface of the earth may be used to filter the detected electromagnetic field within the earth. The remaining signal present after applying the filter may contain the various harmonic, nonlinear, and/or low frequencies of interest. These signals may be further processed or filtered, for example to remove one or more noise signals.

Generating Models of Subsurface Earth Formation 16

Various properties of the subterranean formation 16 may be utilized to develop a geological model of the subterranean earth formation 16. Various modeling programs may be used to develop the model of the subterranean formation and can provide predicted outputs based on the model. The predicted outputs can then be compared with the detected signals 20 and/or 22 to determine if the model is accurate. When a discrepancy is detected, the geological model can be altered and the process repeated. Such a process may result in a match between the geological model and the detected signal, thereby providing one or more properties of the subterranean formation 16. Computing system 30 may be capable of generating various models of the subsurface earth formation 16, including three-dimensional models and time-dependent, or four-dimensional, models. The four-dimensional models may be generated based on signals 20 and/or 22 detected over time. Four-dimensional models may thus illustrate time-dependent properties of subsurface formation 16, including amounts of fluids produced from the reservoir 16, changes to the formation 16 over time, effects of hydrofracturing, migration of pollutants and/or magma, and other time-dependent properties.

Accordingly, the detection and analysis steps may be repeated by computing system 30 any number of times. For example, multiple measurements may be made at a single location over several time periods. The results may be statistically analyzed to provide an improved accuracy correlation and/or survey. In addition, one or more samples may be taken at varying locations sequentially in time or concurrently in time using one or multiple sensors 26 and/or 28. For example, multiple measurements may be made at varying locations around a site of interest. Various grid patterns and/or random sample locations may be chosen to generate a plurality of measurements across an area. For example, the grid and/or array of detectors described above may be used to generate a plurality of detected signals for use with the processing techniques described herein. The multiple measurements may be performed sequentially or concurrently at a single location, and/or the measurements may be performed sequentially and/or concurrently in the various locations around a site of interest when a plurality of locations are used to measure the signal of interest. The resulting hydrocarbon indications and resulting depth measurements may be used to generate a two dimensional, a three dimensional, and/or a time-dependent model the subterranean earth formation 16 and/or the one or more fluids contained therein. In some embodiments, computing system 30 may be capable of generating models using any appropriate combination of survey data obtained from any one or more of the survey techniques discussed below with respect to FIG. 3.

Two dimensional, a three dimensional, and/or time-dependent model may include one or more images and/or maps of subsurface earth formation 16. For example, computing system 30 may utilize passive seismoelectric and/or electroseismic data to develop a two-dimensional or three-dimensional map of the subsurface and/or subsurface zones. Various survey data from any of the techniques in the present disclosure may be correlated to identify particular features of a particular portion of the image and/or map. For example, survey data that is particularly reliable at identifying particular features may be used as a baseline for comparison with other survey data. As another example, survey data for a particular coordinate and/or location in the model may be available from a first survey method but not available from a second survey method. Alternatively or in addition, computing system 30 may be capable of determining the reliability and/or accuracy of particular survey data and may determine to utilize a first portion of geologic data from one methodology over a second portion of geologic data from another methodology. Moreover, in some embodiments, computing system 30 may be capable of, based on reliability determinations, to utilize a particularly reliable data point from a first survey technique as an assumption when processing and/or interpreting data from another survey technique. For example, resistivity information determined from controlled-source electromagnetic (CSEM) surveying and/or depth information from active source surveying may be utilized as assumptions when interpreting passive source electroseismic and/or seismoelectric survey data. Accordingly, information from various survey methodologies may be interleaved, interpolated, extrapolated, and/or combined as appropriate to form the image and/or map of subsurface earth formation 16.

FIGS. 2A, 2B, and 2C are block diagrams illustrating example sensors 26 for passive electroseismic and seismoelectric surveying. As illustrated in the FIG. 2A, sensor 260 may be a particular embodiment of sensor 26 that includes one or more conductive elements 202 and 204, coupling network 210, amplifier 208, and signal processing unit 209. Sensor 260 may be capable of detecting electroseismic signals 22, as previously discussed above with respect to sensor 26. Sensor 260 may output a signal representing detected electromagnetic signals 22. Sensor 260 may be installed and/or disposed in any appropriate housing, including weather-resistant housing, movable vehicles, and/or permanent installations, as is discussed above with respect to sensor 26. Sensor 260 generally operates by comparing a stable reference voltage to a voltage measurement responsive to electromagnetic signals radiated from the ground. Accordingly, sensor 260 may be configured to sense variations in the ground signal, which may be wholly or partially comprised of electromagnetic signals 22, as compared to a reference voltage.

Conductive elements 202 and 204 are generally capable of measuring electromagnetic signals radiated from the ground. As illustrated conductive element 202 measures a stable reference voltage, while conductive element 204 is generally capable of measuring the vertical component of electromagnetic signals 22. Conductive elements 202, 204 may represent any appropriate capacitive and/or conductive plates or other sensing elements. As illustrated, conductive elements 202 and 204 are capacitive plates that are arranged parallel to the surface of the Earth. A generally parallel arrangement to the surface of the Earth may allow conductive element 204 to respond to and/or measure the vertical component of electromagnetic signals 22, which may represent a vertical electric field. Similarly, conductive element 202 may be shielded from and/or configured not to measure the vertical component of electromagnetic signals 22. In some embodiments, conductive elements 202, 204 may form a capacitor. Conductive elements 202, 204 may be a conductive metal such as copper, aluminum, or stainless steel. Particular embodiments of conductive elements 202, 204 may have an area of several square inches to about several square feet. As illustrated, conductive elements 202, 204 may be separated from the Earth by a distance x. Distance x may be any appropriate distance in which conductive elements 202, 204 may be capable of responding to electromagnetic signals 22 transmitted into the air as a vertical electric field. Conductive elements 202, 204 may be configured relatively close to the ground. For example, capacitive plates 202, 204 may be separated from the Earth by about 10-12 inches in particular embodiments. It should be noted, however, that while particular distances are discussed as example, any distance may be used in which conductive elements 202, 204 are capable of detecting electromagnetic signals 22. Conductive elements 202, 204 may each be connected to inputs of amplifier 208. conductive element 202 or conductive element 204 may also be connected to ground. It should be understood, however, that while a particular embodiment of conductive elements 202 and 204 is discussed herein, any appropriate conductive elements may be used. For example, conductive element 202 may represent a flat conductive plate disposed next to conductive element 204, which may be an antenna. Appropriate antennas may include flat conductive plates at predetermined and/or fixed distances from the ground, concave conductive plates above the ground, multiple conductive plates with geometry to concentrate the signal, metal screen or grid of wire in any appropriate shape and/or geometry, monopole wire extending upwards from the ground, wire looped around a ferrite or steel core, or any other appropriate structure capable of being used as an antenna. Moreover, conductive elements 202 and 204 may represent any appropriate conductive elements arranged with geometry to maximize self capacitance. Also, while illustrated as two components conductive elements 202 and 204 may be implemented as a single component. For example, conductive elements 202 and 204 may be implemented using a monopole wire extending upward from the ground and/or a battery arrangement. In some embodiments, conductive elements 202 and/or 204 may represent a conductive sphere.

Amplifier 208 represents any appropriate amplification circuit operable to compare signals generated by capacitive plate 204 to reference signals generated by capacitive plate 202. Amplifier 208 may, for example, represent an operational amplifier. In some embodiments, amplifier 208 may include any appropriate signal conditioning circuits and/or components. For example, amplifier 208 may be capable of performing any one or more of the pre-processing and/or processing steps discussed above with respect to FIG. 1. Amplifier 208 may include appropriate inputs and outputs. As illustrated, capacitive plates 202, 204 are connected to the inputs. The output may be connected to computing system 30. For example, amplifier 208 may be capable of outputting detected electromagnetic signals 22 to computing system 30. Amplifier 208 may, in some embodiments, include appropriate analog-to-digital converters for digitizing detected electromagnetic signals 22.

Signal processing unit 209 represents any appropriate combination of hardware, software, and other components operable to process the output of amplifier 208. For example, signal processing unit 209 may be capable of implementing any one or more of the pre-processing steps discussed above with respect to FIG. 1. Signal processing unit 209 may be hardware-implemented portion of sensor 260 and/or may form a portion of computing system 30. Signal processing unit 209 may include one or more notch filters, low pass filters, high pass filters, clamping circuits, sample and hold circuits, or any other appropriate signal conditioning circuits.

Coupling network 210 represents any appropriate network of components operable to couple conductive elements 202, 204 to amplifier 208. As illustrated, coupling network 210 includes a capacitor C1, inductor L1, capacitor C2 and a resistor R arranged as a pi filter. The pi filter generally is operable to select a desired frequency band for amplifier 208 and to exclude frequencies that may otherwise saturate amplifier 208. The resistor may be any appropriate resistance, and in some embodiments may be selected to set the time constant of the input circuitry of electromagnetic signals 22. Resistor R may be connected across the inputs to amplifier 208 in parallel. Moreover, while a particular embodiment of coupling network 210 is illustrated, any appropriate network components may be used. For example, coupling network 210 may include a matching resistor, a pi filter, a transformer, a resonant network, or any combination and number of these components.

Shielding 212 represents any suitable electromagnetic shielding. Shielding 212 may be configured to attenuate and/or prevent horizontal components of electromagnetic fields from reaching conducting element 214. Shielding 212 may be configured to surround all or a portion of conductive elements 202 and 204. For example, as illustrated, shielding 212 may comprise a structure that surrounds the top and sides of conductive elements 202 and 204. Shielding 212 may, for instance, be a cylindrical structure disposed vertically and that may be closed on at least one end, such as the top end. Alternatively, shielding 212 may represent a box or other appropriate enclosure. Shielding 212 may be made of any appropriate material operable to attenuate and/or prevent electromagnetic signals from propagating through the material. For example, shielding 212 may be made of mu-metal, conductive plates or foil, wire mesh, aluminized Mylar, insulative plates with supplied static charge, and/or conductive plastic. Mu-metal may refer to one or more classes of nickel-iron alloys that are characterized by a high-magnetic permeability. Shielding 212 may shield against static or slowly varying electromagnetic fields that may otherwise interfere with the detection of electromagnetic signals 22. Shielding 212 may be electrically connected and/or coupled to an input to amplifier 208. It should also be understood that in particular embodiments, shielding 212 may or may not be appropriate and/or necessary.

In operation, electromagnetic signals 22 may be a time varying, vertical electric field. The interaction of electromagnetic signals 22 with capacitive plate 204 may produce a charge on conductive elements 204. The other plate 202 may be shielded from electromagnetic signals 22. Accordingly, signals generate by plate 202 may be interpreted as the reference voltage. Accordingly, a capacitive charge across conductive elements 202 and 204 may result that corresponds to electromagnetic signals 22. In some embodiments, a resistor may be coupled in series with the charged conductive element 202. At appropriate times, the charged conductive plate 202 may be discharged and thereby allow a time-varying field representative of electromagnetic signals 22 to be measured, processed, and/or recorded by computing system 30. By using parallel conductive elements 202, 204, sensor 260 may detect only the vertical components of electromagnetic signals 22 or other electromagnetic signals. Accordingly, the parallel plate design may be configured not to respond to the horizontal components of electromagnetic signals 22. While two conductive elements 202, 204 are shown, sensor 260 may include a single plate appropriately grounded through one or more resistive devices and coupled to computing system 30.

FIG. 2B illustrates sensor 262, which may be a particular embodiment of sensor 26 that includes coupling network 211, shielding 212, conductive element 214, electrode 216, amplifier 218, and signal processing unit 219. Like sensor 260, sensor 262 may be capable of detecting electroseismic signals 22, as previously discussed above with respect to sensor 26. Sensor 260 may also output a signal representing detected electromagnetic signals 22. Sensor 260 may be installed and/or disposed in any appropriate housing, including weather-resistant housing, movable vehicles, and/or permanent installations, as is discussed above with respect to sensor 26.

Coupling network 211 represents any appropriate network of components operable to couple conductive elements 202, 204 to amplifier 208. As illustrated, coupling network includes a resistor R of an appropriate resistance, which may be selected to set the time constant of the input circuitry of electromagnetic signals 22. Resistor R may be connected across the inputs to amplifier 208 in parallel. Moreover, while a particular embodiment of coupling network 211 is illustrated, any appropriate network components may be used. For example, coupling network 211 may include a matching resistor, a pi filter, a transformer, a resonant network, or any combination and number of these components.

Shielding 212 represents any suitable electromagnetic shielding, as discussed above with respect to FIG. 2A. Shielding 212 may be configured to surround all or a portion of conducting element 214. For example, as illustrated, shielding 212 may comprise a structure that surrounds the top and sides of conducting element 214. Shielding 212 may be electrically connected and/or coupled to an input to amplifier 218. As noted above, it should be understood that in particular embodiments, shielding 212 may or may not be appropriate and/or necessary.

Conductive element 214 represents any appropriate conductive element operable to generate a stable reference signal shielded from one or more vertical and/or horizontal components of electromagnetic signals 22. Conductive element 214 may represent a conductive plate. As illustrated, conducting element 214 is a conductive plate that includes multiple folds that form multiple parallel portions of conductive element 214. Folding conductive element 214 into multiple folded portions may allow conductive element 214 to fit within a much smaller volume while also having a sufficiently large surface area to detect electromagnetic signals 22. Additionally or alternatively, conductive element 214 may include a conductive spine portion that forms a backbone or connection to multiple conductive fins. Conductive element 214 may be electrically connected and/or coupled to an input to amplifier 218. Distance y represents any appropriate distance separating conductive element 214 from the surface of the Earth. For example, in a particular embodiment, the distance may be about 24 inches. In some embodiments, distance y may be relatively larger than distance z.

Electrode 216 represents any appropriate electrical component configurable to form a connection with the Earth and/or detect one or more vertical portions of electromagnetic signals 22. Electrode 216 is configured to form an electrical contact with the Earth and may be disposed within the Earth. For example, electrode 216 may be disposed in a hole drilled into the Earth ranging from several inches to about 10 feet to about 15 feet. Additionally or alternatively, electrode 216 may be disposed within the Earth at varying depths as needed to form an electrical coupling with the Earth. In some embodiments, electrode 216 represents a porous pot electrode. Porous pot electrodes may include an appropriate salt and/or aqueous solution to form an electrical coupling with the Earth. Suitable salts useful with the electrodes may include, but are not limited to, copper sulfate, silver chloride, cadmium chloride, mercury chloride, lead chloride, and any combination thereof. In some embodiments, electrode 216 may include a conductive electrode such as rods that are driven into the ground and/or sheets of metal, mesh sheets, and/or wires buried in trenches or in shallow pits. Electrode 216 may be made of a variety of conductive materials including, but not limited to, copper, stainless steel, aluminum, gold, galvanized metal, iron, lead, brass, graphite, steel, alloys thereof, and combinations thereof. Electrode 216 may be electrically connected and/or coupled to shielding 212 and an input to amplifier 218. Electrode 216 may represent a porous pot, a conductive stake, a buried length of wire, a buried wire mesh, and/or a group of or combination of the aforementioned components.

Amplifier 218 and signal processing unit 219 may be similar to amplifier 208 and signal processing unit 209. As illustrated, an input to amplifier 218 is connected to shielding 212 and another input is connected to conductive element 214. Coupling network 211 includes a resistor R connected across the inputs to amplifier 218. Electrode 216 is also connected to the input connected to shielding 212.

In operation, electromagnetic signals 22 may be a time varying, vertical electric field. The interaction of electromagnetic signals 22 with conductive element 216 may cause and/or induce an electric response to be conducted and/or transmitted to the input to amplifier 218. Shielding 212 may attenuate and/or prevent horizontal electromagnetic signals from reaching conductive element 214. Accordingly, the signals detected by conductive element 214 may represent a stable reference voltage while the signals detected by conductive element 216 may represent may correspond to electromagnetic signals 22. Amplifier 218 may perform appropriate signal processing and output detected electromagnetic signals 22 to computing system 30. By using conductive element 214 and shielding 212, sensor 262 may detect only the vertical components of electromagnetic signals 22. Accordingly, the design of sensor 262 may be such that sensor 262 does not respond to horizontal components of electromagnetic signals 22 or other electromagnetic signals.

FIG. 2C illustrates current sensor 264, which may be a particular embodiment of sensor 26 that includes shielding 212, electrode 216, coupling network 213, resistor 226, amplifier 228, signal conditioning unit 229, and battery 230. Sensor 264 may be capable of detecting electroseismic signals 22 may be capable of sensing signals 22 as a current across a sense resistor 226. Sensor 260 may also output a signal representing detected electromagnetic signals 22. Sensor 260 may be installed and/or disposed in any appropriate housing, including weather-resistant housing, movable vehicles, and/or permanent installations, as is discussed above with respect to sensor 26.

Shielding 212 represents any suitable electromagnetic shielding, as discussed above with respect to FIG. 2A. Shielding 212 may be configured to surround all or a portion of battery 230. For example, as illustrated, shielding 212 may comprise a structure that surrounds the top and sides of battery 230. Shielding 212 may be electrically connected and/or coupled to an input to amplifier 228. In particular embodiments, shielding 212 may additionally or alternatively surround all or a portion of coupling network 213. As illustrated, shielding 212 surrounds sense resistor 224 of coupling network 213. As noted above, it should be understood that in particular embodiments, shielding 212 may or may not be appropriate and/or necessary.

Coupling network 213 may include any appropriate components operable to couple battery 230 to amplifier 218. Coupling network 213 may include similar components as discussed above with respect to FIGS. 2A and 2B. As illustrated, coupling network 213 includes current sensor 222 and sense resistor 224. Current sensor 222 represents any appropriate current sensor operable to detect a current I generated by electrode 216. As illustrated, current sensor 222 is a current transformer that senses current as a voltage drop across a sense resistor 224. The current transformer may be a step-up transformer with, for example, up to 1000 times gain or more. Current sensor 222 may represent any appropriate current sensing technologies, including Hall effect sensors, a senseFET, or other appropriate current sensor.

Battery 230 represents any appropriate voltage source operable to allow current to flow from ground across sense resistor 224. Battery 230 may have a large self-capacitance. Charge may leak from ground and attempt to charge battery 230. Battery 230 may have a capacitance and/or resistance between the battery and ground, which may represent the capacitance and/or resistance of air. Electrode 216 may be connected to a terminal of resistor 224. Resistor 224 may be connected between the terminals of current sensor 222. One terminal of resistor 224 may be connected to a terminal of battery 230. Resistor 226 may be connected in parallel with battery 230. The outputs of current sensor 222 may be connected to the inputs of amplifier 228, which may provide an output representing electromagnetic signals 22. Amplifier 228 and signal conditioning unit 229 may be similar to amplifier 208 and signal processing unit 209. It should be noted that in some embodiments battery 230 may additionally or alternatively comprise a capacitor. It should also be noted that in some embodiments, a current amplifier may additionally or alternatively perform the functions of current sensor 222, sense resister 224, and amplifier 228.

In operation, variations in ground potential caused by electromagnetic signals 22 and Earth's background electromagnetic field 14 may induce a current I across sense resistor 224 that may be detected by current sensor 222. Amplifier 228 and/or signal conditioning unit 229 may perform appropriate signal processing and output detected electromagnetic signals 22 to computing system 30.

It should be noted, however, that while FIGS. 2A, 2B, and 2C illustrate particular embodiments of sensors 26, sensors 26 may include any appropriate number and combination of components operable to detect portions of electromagnetic signals 22, such as various antennas or other sensing elements. Suitable antennas may include, but are not limited to, a parallel-plate capacitor antenna comprising two or more parallel conducting plates; a single-plate capacitor antenna comprising one electrode electrically coupled to the earth; a monopole antenna comprising a conducting element, a dipole antenna comprising two conducting elements; a multi-pole antenna comprising a plurality of conducting elements; a directional antenna comprising conducting elements arranged to augment a signal amplitude in a particular direction, and a coil antenna comprising one or more coils of wire, and/or any combination of suitable antennas. In some embodiments, sensor 26 may represent a concentric electric dipole (CED). The CED may include two electrodes in a concentric configuration. For example, the electrodes may be generally circular dipoles with an inner circular electrode disposed concentrically within an outer circular electrode. The electrodes may generally be aligned in a plane that is parallel with the plane of the surface of the earth. The CED may then preferentially detect the vertical portion of electromagnetic signals 22 that are substantially perpendicular to the plane of the CED. The vertical portion of electromagnetic signals 22 may create a detectable potential difference between the two electrodes.

In some embodiments, the electromagnetic sensor 26 may comprise a pair of electrodes in contact with the earth and disposed within the earth. For example, a first electrode may be disposed in a hole drilled into the earth ranging from about 10 feet to about 15 feet. A second electrode may be disposed within about 1 foot to about 3 feet of the surface of the earth, and the pair of electrodes may be electrically coupled. In some embodiments, the pair of electrodes may be disposed within the earth at varying depths as needed to form an electrical coupling with the earth. In some embodiments, the electrodes may take the form of porous pot electrodes or other electrodes, such electrode 216. In some embodiments, the electrodes may comprise a conductive electrode in contact with the earth and electrically coupled to a porous pot electrode.

Figure 3:
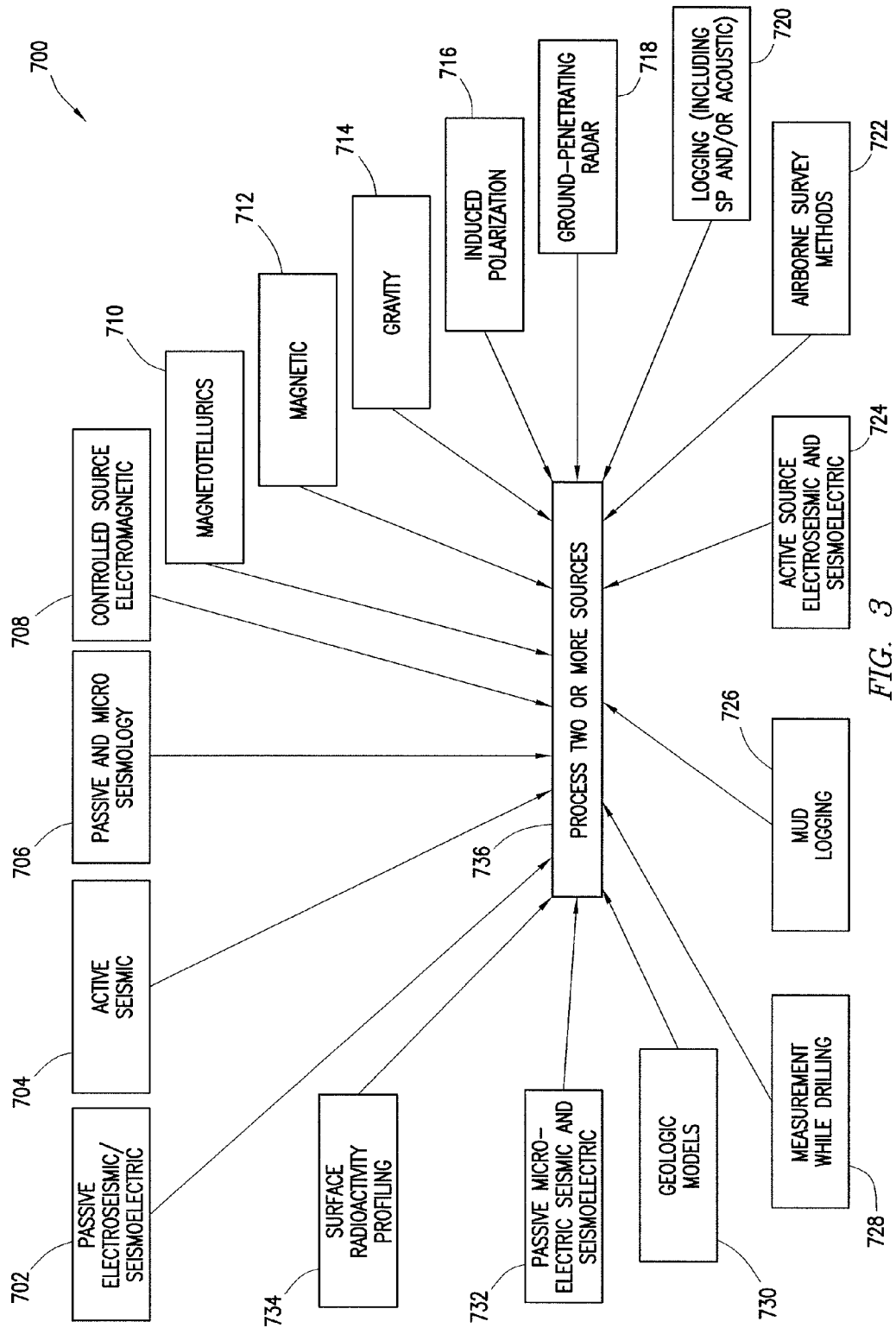
FIG. 3 is a flowchart illustrating an example method for processing two or more sources of geophysical survey data.

FIG. 3 is a flowchart illustrating an example method 700 for processing two or more sources of geophysical survey data. Sources of geophysical survey data include passive electroseismic and seismoelectric surveying 702, active seismic surveying 704, microseismology 706, controlled-source electromagnetic surveying 708, magnetotelluric surveying 710, magnetic surveying 712, gravity surveying 714, induced polarization 716, ground-penetrating radar 718, and various logging technologies including logging (including SP and/or acoustic logging) 720, airborne surveying 722, active electroseismic and seismoelectric surveying 724, mud logging 726, measurement while drilling 728, geophysical and/or geological models 730, passive micro-electric seismic and seismoelectric surveying 732, and surface radioactivity profiling 734. In general, computing system 30 may be capable of processing and/or cross correlating two or more available sources of geophysical survey data at step 736. Processing two or more available sources of geophysical data may allow computing system 30 to determine a more accurate and/or complete identification of various properties of subsurface formation 16 than may otherwise be achievable by processing a single source of geophysical survey data. For example, computing system 30 may be capable of utilizing particular survey methods that have particular strengths at identifying particular properties, and use those properties as a baseline for comparison and/or correlation with data from other survey methods.

Passive electroseismic surveying 702 may include the method of electroseismic and seismoelectric surveying discussed above with respect to FIG. 1. As described in more detail below, passive survey data detected by, for example, sensors 26 and/or 28, may be processed and/or correlated by computing system 30 in order to determine and/or confirm properties of subsurface earth formation 16.

Active seismic surveying 704 may include any form of seismic surveying that utilizes an active source of seismic energy to determine one or more properties of subsurface earth formation 16. Active sources of seismic energy may include explosives, thumpers, and other man-made or man controlled forms of seismic energy. Active seismology typically produces information indicative of geologic structures. Seismic prospecting techniques generally involve the use of an active seismic energy source and a set of receivers spread out along or near the earth's surface to detect seismic signals reflected from subsurface geological boundaries, such as boundary 18 illustrated in FIG. 1. These signals are recorded as a function of time. Computing system 30 may subsequently process these signals to reconstruct an appropriate image of the subsurface earth formation 16.

In active seismic surveying 704, seismic energy may travel from the active source into the Earth, reflect from a particular geologic layer at a seismic impedance contrast, and return to the receiver as a reflected seismic wave. The seismic energy may be so-called shear waves (S-waves) or so-called compressional waves (P-waves). Shear waves and compressional waves differ with respect to their velocities, angles of reflection, vibrational directions, and to some extent the types of information that may be obtained from their respective types of seismic data. However, both types of waves suffer similar attenuation by subsurface earth formations 16. Subsurface earth formations 16 tend to attenuate relatively higher frequency components and allow relatively lower frequency components to pass through the earth with relatively little attenuation. For deeper formations, the low frequency content of the reflected seismic energy may represent information about the underlying subsurface earth formations 16. Because of the low frequency of the detected reflected seismic energy, however, the resolution of the reflected seismic energy may be insufficient to allow for detection of relatively thin geologic layers. Passive microseismology 706, or micro-seismic surveying, may refer to any appropriate survey technology that detects micro-seismic energy to determine one or more properties of a subsurface earth formation 16. Microseismology generally relies on small, localized seismic events generated in the earth by naturally occurring earth movements or by well-drilling operations. Microseismology is then a form of passive seismic surveying because the source of seismic energy is not generated specifically for the purpose of surveying. Such seismic events may be generated and/or caused by tectonic forces, ocean tides and/or other natural phenomena. Seismic waves may also be created when drilling or earth fracturing operations are conducted in hydrocarbon exploration, production, or in water well services. These natural and man-made events may be referred to as microseismic events. Generally, micro-seismic surveying yields qualitative information about the location of subsurface structures or positional information about drilling operations. In this survey methodology, location of the seismic source may be imperfectly known. Accordingly, microseismology may be useful to generate high-level information regarding subsurface earth formation 16, but may be less useful for generating high-resolution images and/or data about subsurface earth formation 16. In some embodiments, microseismology may locate the source of fracturing events such as encountered in fracturing reservoirs.

Controlled-source electromagnetic (CSEM) surveying 708 may include any appropriate surveying methodology that utilizes a an electromagnetic source of energy and determine one or more properties of subsurface earth formation 16. CSEM 708 is particularly useful for providing electrical resistivity information that indirectly indicates the presence of hydrocarbons. Utilizing data from CSEM surveying 708 and passive electroseismic/seismoelectric surveying 702, computing system 30 may be capable of determining both structural and fluid property information associated with subsurface earth formation 16. Controlled-source electromagnetic surveying 708 involves the use of a source of electrical power and a set of electromagnetic receivers. Those electromagnetic receives may be deployed on the seafloor in deep water, although land-based applications are also possible. Although CSEM surveying 708 may be done on land or in shallow water, recent work finds particularly useful applications in deep water. In CSEM surveying 708, a power source may drive an electrical current into the earth that passes through the various subsurface rock formations. The electrical current follows a path of low electrical resistance through the most conductive rock masses. Hydrocarbon reservoirs contain insulating gas or oil fluids. Accordingly, the applied electrical current tends to flow around resistive reservoir structures. The deflection of current around reservoirs is detected as a change in electromagnetic response on the electromagnetic detectors. The measured signal properties can be processed by computing system 30 to determine the presence of resistive structures that may indicate the presence of hydrocarbons.

In controlled-source seismoelectric surveying, generally a seismic source that might be dynamite or a seismic vibrator, creates a seismic wave that propagates into the subsurface where its seismic energy is partially converted to an electric field at a boundary between rock types or at fluid interfaces. The produced electric field then propagates to the surface of the earth where it is detected with electric and/or magnetic field sensors.

In controlled-source electroseismic surveying, a source of electrical power is connected to electrodes in contact with the earth's surface. The voltage applied to the electrodes causes electrical current to flow in the subsurface. When that current passes through a rock boundary or a fluid interface, a portion of the electrical energy may be converted to seismic energy. The resulting seismic energy may then propagate to the earth's surface where it is detected with seismic detectors that might be selected from geophones, accelerometers, or hydrophones.

Both seismoelectric and electroseismic conversion amplitudes depend on the presence of hydrocarbon fluids so both methods yield information about rock fluid content that is of use in hydrocarbon exploration and production. Both methods also yield high resolution images of rock formations that are typical of seismic surveying. High power sources that may be utilized by CSEM surveying 708 and by active seismoelectric and electroseismic surveying 722 are typically expensive. As a result, the costs of these active-source survey methods may tend to limit its commercial viability of CSEM surveying 708 and active-source seismoelectric and electroseismic surveying 722 in some environments.

Magnetotelluric surveying 710 may include any appropriate surveying methodology that utilizes the Earth's background electromagnetic fields to determine the subsurface electrical conductivity of the Earth. Magnetotelluric surveying 710 may utilize appropriate electromagnetic sensors, such as sensors 26, to detect the low-frequency portion of the Earth's background electromagnetic field. Based on the detected low-frequency signals, computing system 30 may estimate the subsurface electrical conductivity. Magnetotelluric surveying 710 may be useful for determining electrical conductivity, which may be indicative of the types of materials in subsurface formation 16, but may be less useful for determining detailed location or shape properties of subsurface earth formation 16. The natural electromagnetic fields detected using magnetotelluric surveying 710 generally originate in the earth's atmosphere. Naturally-occurring electromagnetic fields typically propagate into the subsurface where they encounter rock formations of differing electrical conductivity. When the electromagnetic fields contact a formation of low conductivity, such as is typical of hydrocarbon reservoirs, the electromagnetic field measured at the surface of the earth changes. Spatially-dependent electromagnetic fields measured on the earth's surface can be used to indicate the presence of low-conductivity formations that might contain hydrocarbons. Magnetotelluric surveying 710 has several limitations when used alone. Only low-frequency, long-wavelength electromagnetic stimulation may reach prospective reservoirs because the high-frequency electromagnetic fields are rapidly attenuated by the conducting earth. Long-wavelength electromagnetic waves limit the spatial resolution of magnetotellurics making reservoir delineation difficult. Additionally, magnetotelluric surveying only provides information about formation electrical conductivity and does not yield data revealing information about porosity, permeability, or reservoir structure.

Magnetic surveying 712 may include any appropriate surveying methodology that utilizes magnetic-field sensing devices to measure the magnetic field of the Earth and determine one or more properties of subsurface earth formation 16. Magnetic surveying 712 may be particularly suited for surveying from aircraft. Magnetic surveying 712 may be based on the fact that hydrocarbon reservoirs and mineral deposits, such as iron ore, may alter the local earth's magnetic field. Accordingly, computing system 30 may process data received from magnetic field sensing devices in combination with passive electroseismic and seismoelectric surveying 702 to determine the presence of reservoir structures and/or the presence of hydrocarbons and other minerals. Magnetic surveying 712 may have several limitations when used alone. Magnetic surveying 712 may be less useful for determining and/or measuring properties related to the reservoir spatial extent and structure of subsurface earth formation 16. Magnetic surveying 712 also may not be capable of identifying particular fluids and/or minerals or fluid flow properties.

Gravity surveying 714 may include any appropriate surveying methodology that utilizes gravity detectors to determine one or more properties of subsurface earth formation 16. Reservoirs such as subsurface earth formation 16 typically have smaller mass density than non-reservoir rock. A gravity meter of sufficient sensitivity may be capable of detecting the difference in mass density of subsurface earth formation 16 as compared to surrounding formations. Computing system 30 may determine the presence of subsurface earth formation 16 based on receiving data from a gravity meter indicating a minimum in local gravitational acceleration over subsurface earth formation 16. Gravity surveying 714 may have several limitations when used alone. For example, local gravity values reflect an average of the mass densities from all materials in the neighborhood of the gravity detector. Accordingly, while reservoirs of low density reduce the measured gravitational acceleration, the presence of high-density rock may increase the measured gravitational acceleration. Thus, the presence of high-density rock may reduce the spatial resolution of the measurement and accordingly obscure the presence of a low-density formation. In addition, the spatial resolution of gravity measurements may be generally limited to length scales comparable to the depth and lateral extent of the reservoir. The amplitude of the identifying gravity signature depends on the volume of the reservoir. Gravity surveying 714 may also be less useful for determining properties such as reservoir structure, pore-fluid properties, or permeability. Gravity and magnetics surveying 712 and/or 714 may be particularly useful for surveying large areas, such as whole geological basins.

Induced polarization (IP) surveying 716 may include any appropriate methodology for utilizing an induced potential field in the Earth to determine one or more properties of subsurface earth formation 16. Measuring the induced potential field may allow computing system 30 to determine chargeability and resistivity of subsurface earth formation 16. One or more transmission electrodes may be utilized to drive and/or induce current into the ground, which may induce a potential field. One or more sensors, such as potentiometers, may measure the induced potential field. There are various techniques for IP surveying 716, including time-domain based IP surveying and frequency-domain based IP surveying. In time-domain based surveying, the transmission electrodes may drive a charge into the Earth for a specified amount of time. The sensors measure the potential field during the on and off period of the transmission electrodes. Based on on-time peak voltage measurements, the apparent resistivity of subsurface earth formation 16 may be calculated by computing system 30. Based on measurements of the transient voltage decay during the off-time of the transmission electrodes, computing system 30 may calculate chargeability.

Ground-penetrating radar (GPR) surveying 718 may include any appropriate surveying methodology that uses ground-penetrating radio waves to determine one or more properties of subsurface earth formation 16. The radio waves may be electromagnetic waves in the microwave band of the radio spectrum. Transmitters may generate high-frequency radio waves and transmit the radio waves into the Earth. Antennas or appropriate sensing elements may detect a return signal reflected from subsurface earth formation 16. When the generated radio wave hits an object or boundary, such as boundary 18 with differing dielectric constants, the receiving antenna receives variations in the reflected return signal. Those variations may be processed by computing system 30 to identify structural features of the subsurface. The penetration depth of GPR surveying 718 may generally be limited by the electrical conductivity of the ground beneath the transmission signal. As conductivity decreases, signal depth may increase. Accordingly, GPR surveying 718 may be particularly useful for low-conductivity ground types, such as ice, dry sandy soils, granite, limestone, and concrete. In high-conductivity ground types, GPR surveying 718 may only penetrate a few meters. Even in low-conductivity materials, GPR surveying 718 may be particularly useful for identifying features that are only up to several hundred meters in depth. Accordingly, GPR surveying 718 may be utilized by computing system 30 to identify properties of near-surface formation 24, such as objects, changes in materials, voids, cracks, and the presence and amount of ground water and other fluids. GPR surveying 718 may also be useful for identifying and/or tracking pollutants and contaminants.

Logging 720 may include any appropriate logging technique, including acoustic and/or spontaneous potential logging. Logging 720 may include passive logging techniques such as spontaneous potential (SP) logging to measure resistivity and/or conductivity of the surrounding formation In particular, SP logging 720 may include any appropriate surveying methodology that uses passive measurements to determine electrical potentials between various depths in a well-bore. SP logging 720 is a technique that may generally be utilized by well-loggers during drilling operations. One or more sensors, such as potentiometers, may measure electric potentials between depths in a well-bore and a grounded voltage at the surface. Changes in electrical potential may be caused by a build-up of charge in the well bore walls. The well-bore may include conductive fluids to facilitate a SP response. SPs may occur when two aqueous solutions that have different ionic concentrations are placed in contact through a porous, semi-permeable membrane. Ions tend to migrate from high to low ionic concentrations. In the case of SP logging 720, two or more aqueous solutions may be the conductive fluid in the well bore, such as drilling mud, and the water in a subsurface earth formation 16. Whether the conductive fluid contains more or less ions than the formation water may cause the SP to deflect opposite a permeable subsurface earth formation 16. Measurements of SP may be utilized by computing system 30 to detect the presence of hydrocarbons, which may reduce the response on an SP log due to the reduction of contact between the conductive fluid in the well-bore and contact with formation water. SP logging 720 may be utilized to determine locations and/or depths of permeable subsurface earth formation 16. the boundaries of subsurface earth formation 16, formation water resistivity, and other properties. Measurements of SP may be utilized by computing system 30 to determine the location of potential gradients where electroseismic and/or seismoelectric conversions are likely to occur. Computing system 30 may then determine depths where signals 20 and/or 22 signals are correlated with SP amplitudes. Logging 720 may additionally or alternatively include active source logging. For example, active source logging may use an active source such as a nuclear source and an associated sensor. One example nuclear source may include thorium or other gamma emitting materials.

Other logging methods 720 may include conductivity logging, acoustic logging, dielectric constant logging, gamma ray logging, formation tester logging, microresistivity or imaging logging, density, neutron porosity, sonic, caliper, and nuclear magnetic resonance logging. Generally, computer system 30 may use logging data individually and/or in correlative fashion to determine subsurface rock and fluid properties. In combination with passive electroseismic and seismoelectric detection 702, logging data from single logs or in combination with several or many logs 720, computer 30 may determine the structural and fluid properties of subsurface formations, particularly those containing hydrocarbons.

Airborne surveying 722 may include any appropriate surveying methodology that uses airplanes, helicopters, or lighter-than-air means for deploying geophysical surveying detectors. Detectors may include but are not limited to gravity, electric field, magnetic field, electromagnetic field, video, infrared, ultraviolet, and other sensors in the electromagnetic spectrum. Airborne surveys 722 may generally cover large areas of the Earth's surface. Accordingly, particular airborne survey methods 722 may achieve only lower spatial resolution as compared to other survey methods. Such surveys are not generally used for detailed analysis of reservoir properties but may guide the locations where high-resolution surveys such as seismology and electroseismology may be useful. Accordingly, another survey, such as a passive electroseismic/seismoelectric survey 702, may be initiated in response to information about subsurface formation 16 gleaned from airborne surveying 722.

Mud logging 726 may include any appropriate methodology for detecting the properties of the drilling cuttings created during drilling a hole for hydrocarbon exploration or other purposes. Mud logging 726 may determine the type of rock penetrated by the drill bit, the presence of hydrocarbon or water in the cuttings, radio activity that is an indicator of hydrocarbons or shales, and microscopic rock properties related to porosity and permeability.

Measurement while drilling 728 may include any methodology suitable for detection of subsurface properties near the drill bit and/or changes in subsurface formations caused by drilling operations such as fracturing and flowing fluids. These properties may include but are not limited to acoustic properties, electrical properties, fracture properties, drill bit location, formation pressure, porosity, and permeability.

Geological and geophysical models 730 may include information generated by studying the geological history, the present day setting, analogies to near sites, and experience gained by measurements on many geological formations. Such models may offer guidance to reduce the risk in finding and developing subsurface resources.

Passive micro-seismoelectric and micro-electroseismic surveying 732 may include any methodology suitable for detecting electromagnetic and/or seismic emanations from passive, naturally-occurring, and/or man-made seismic and/or electromagnetic sources of energy below the Earth's surface. Microseismology 706 may detect seismic events originating at depth as discussed above, while passive micro-seismoelectric and micro-electroseismic surveying 732 may take advantage of the combined use of both the electromagnetic field and the seismic energy generated by subsurface events. For example, earthquakes, tidal motion, and tectonic forces generate both electromagnetic and seismic sources of energy. Such events are known to generate seismic and electromagnetic energy. These events may also generate secondary electromagnetic and seismic signals caused by electroseismic and seismoelectric conversions. Microseismic events created during well-drilling operations, formation fracturing, fluid production, and fluid migration are of particular importance in hydrocarbon production and exploration, and in aquifer development. It is known that formation fracturing and fluid flow in the subsurface create seismic events that are of use in locating the drill bit, analyzing fracture development and in detecting fluid migration. Microseismic monitoring 706 may be limited by the uncertain location of the source signal and by uncertainty in the seismic properties of the subsurface, particularly the velocity of seismic waves in the subsurface. Micro-electroseismology and micro-seismoelectric methods 732 may overcome these limitations on microseismology.

In one embodiment, fracture events and drill-bit noise generated during drilling and/or hydraulic fracturing may generate both seismic waves and electromagnetic energy that propagate to the surface of the earth and/or to the location of wells. The electromagnetic propagation is known to travel at a speed that is much larger than the seismic wave. Detection of the arrival of the EM wave ahead of the seismic wave can then permit analysis of the seismic travel time and may permit more accurate determination of the depth to the origin of the seismic signal. The detection of such electromagnetic and seismic energies may be conducted on the surface of the earth, in shallow holes or in wells. The detection means may be seismic detectors such as geophones, hydrophones in wells, accelerometers, digital accelerometers as well as antennas designed to detect the electromagnetic energy.

In another embodiment, the seismic and/or electromagnetic waves generated by drilling and/or fracturing activities may further generate secondary electromagnetic and seismic energies through electroseismic and/or seismoelectric conversions. Detecting these secondary EM and seismic fields may advantageously improve the analysis of the location of subsurface structures 16 as well as the location and probable identity of pore fluids. Computing system 30 may process micro-electroseismic and micro-seismo-electric data concurrently or in sequence with passive electroseismic and seismoelectric data to locate the microseismic events within the larger structure of interest 16.

In another embodiment, the seismic and/or electromagnetic waves generated by drilling and/or fracturing activities may further generate secondary electromagnetic and seismic energies through electroseismic and/or seismoelectric conversions that propagate to additional geological structures at greater depth or at distances far from the signal origin. For example, a seismic wave created by drilling and/or fracturing activity may propagate to a greater depth where seismic reflection and/or seismoelectric conversion occur. The then generated secondary event may propagate to the surface or a well location where it may be detected. The secondary wave field may then be useful in creating an image of the deep structure. Alternatively or in addition to the secondary conversion event may occur at a distant location from the source event at a depth similar to the source depth or shallower than the source event. Such secondary conversions may advantageously generate signals useful in identifying additional structures 16 and/or may, after signal processing in computer 30, identify fluids such as hydrocarbon fluids.

Surface radioactivity profiling 734 may include any appropriate surface radioactivity profiling technique, such as surface gamma ray surveying. For example, some subsurface earth formations 16 may exhibit a chimney effect in which fluids or minerals may seep to the surface. This seepage may cause radioactive changes at the surface that can be detected through the use of surface radioactivity profiling 734.

Computing system 30 may, at step 736, process survey data from two or more sources of geophysical survey data, including two or more of passive electroseismic surveying 702, active seismic surveying 704, microseismology 706, controlled-source electromagnetic surveying 708, magnetotelluric surveying 710, magnetic surveying 712, gravity surveying 714, induced polarization 716, ground-penetrating radar 718, logging 720, airborne surveys 722, active electroseismic and seismoelectric surveying 724, mud logging 726, measurement while drilling 728, geological modeling 730, passive micro-seismoelectric and micro-electroseismic surveying 732, and surface radioactivity profiling 734. For example, by utilizing data from passive electroseismic surveying 702 in conjunction with data from various other survey methods, disadvantages and limitations of the other survey methods may be reduced and/or eliminated.

In some embodiments, more information may be obtained about the subterranean formation by conducting one or more additional surveys before, after, or during any of the passive electroseismic surveying 702 techniques described herein have been carried out. For example, an active seismological survey 704, a microseismic survey 706, CSEM survey 708, a gravity survey 714, magnetic survey 712, IP survey 716, and/or GPR survey 718 may be conducted based on an indication of a fluid present in the subterranean formation of interest. Alternatively or in addition, passive electroseismic surveying 702 may be performed based on data from any of the survey methods described herein being processed by computing system 30 to identify a property of subsurface earth formation 16 of interest for further exploration and/or surveying. Passive electroseismic surveying 702 may thus be utilized as a precursor to additional surveying methodologies to provide an initial analysis to identify regions of interest for additional surveying. Additionally or alternatively passive surveying 702 may be used after those methodologies are employed to obtain more detailed information about a region of interest surveyed using another technique. In some embodiments, passive electroseismic surveying 702 may be utilized during the same surveying operation in conjunction with other survey methods. Passive electroseismic surveying 702 may be utilized at the same time and/or during intervals in which other survey methods are not being utilized. For example, passive electroseismic surveying 702 may be capable of detecting signals 20 and/or 22 during periods in which a response signal generated by an active source of seismic energy during an active seismic surveying 704 operation is reduced and/or attenuated. Alternatively or in addition, computing system 30 may be capable of filtering sources of active seismic energy and detect signals 20 and/or 22 during active seismic survey 702 operations. The additional passive electroseismic survey 702 may provide for more data over a greater number of sensors and/or detectors to obtain higher quality information about the subterranean earth formation 16 than other survey methods. Thus, method 700 may be utilized by computing system 30 as described herein in combination with other surveying techniques to provide information about a subterranean earth formation 16. Particular embodiments and correlation techniques for combinations of various survey methodologies are discussed below with respect to FIGS. 4-7. In some embodiments, passive electroseismic surveying 702 may be used alone or in conjunction with other survey methods to determine a location at which to drill and/or commence one or more wellbores into subsurface earth formation 16. For example, computing system 30 may, as described above, detect an envelope using passive electroseismic surveying 702 that indicates the presence of one or more hydrocarbons in subsurface earth formation 16. Based on the envelope, computing system 30 may determine a drilling operation can or should be undertaken at a particular location relative to subsurface earth formation 16. Additionally or alternatively, passive electroseismic surveying 702 may be used alone or in conjunction with other survey methods to determine locations at which to commence any other appropriate mining operation as appropriate to recover the particular type of mineral, which may also be based on the depth, geologic surface features, and/or surrounding formations in the subsurface.

Figure 4:
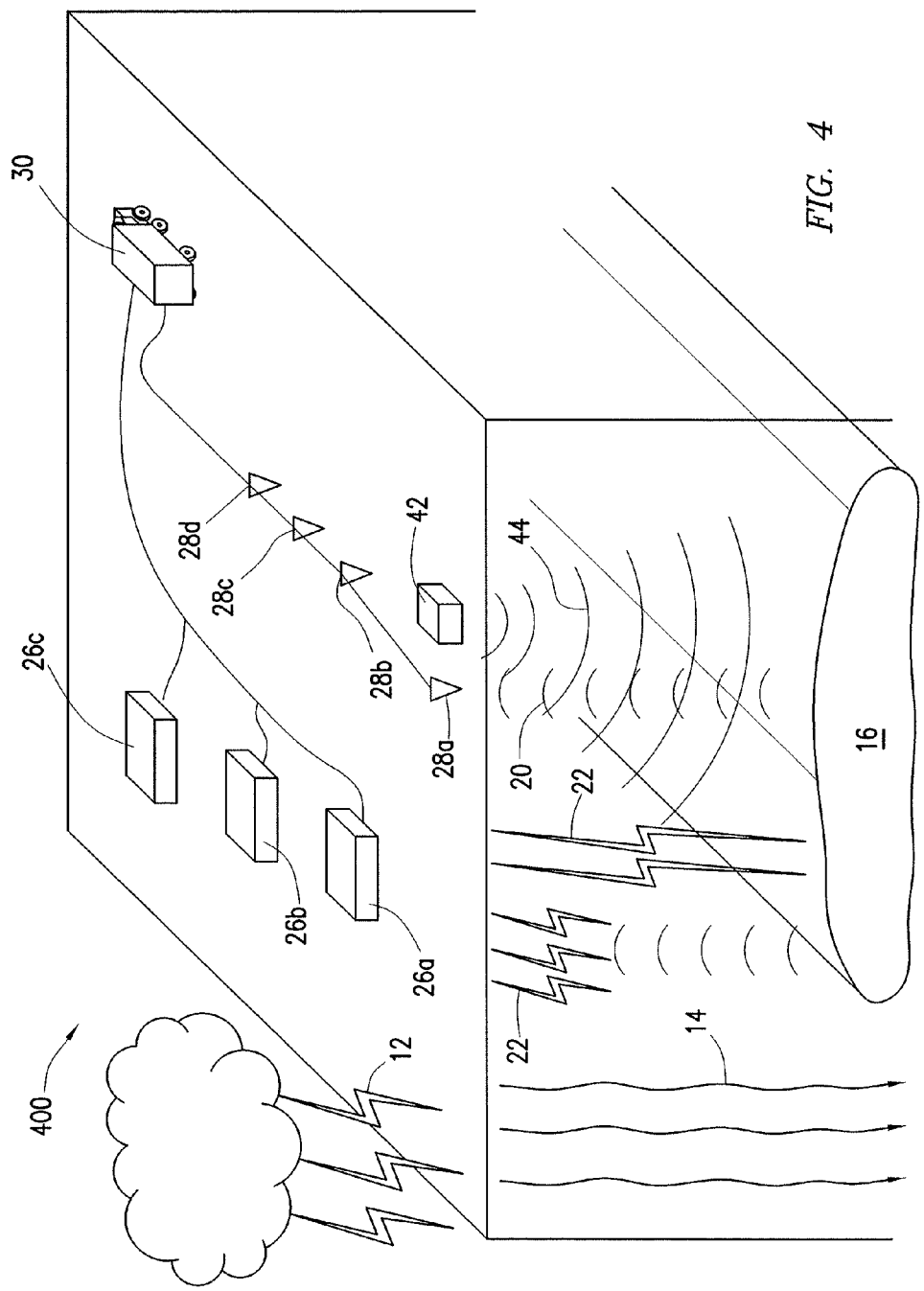
FIG. 4 is a perspective diagram illustrating an example surveying system utilizing passive electroseismic and seismoelectric surveying techniques, active electroseismic and seismoelectric surveying techniques, and active seismic surveying techniques.

FIG. 4 is a perspective diagram illustrating an example surveying system 400 utilizing passive electroseismic and seismoelectric surveying 702 techniques and active seismic surveying 704 techniques, which explained above, may include active electroseismic and seismoelectric surveying techniques. As illustrated system 400 includes electromagnetic sensors 26, seismic sensors 28, computing system 30 which have been described above with respect to FIG. 1 and may operate in a similar manner as described above with respect to system 10. In addition, system 400 may include one or more active seismic generators 42 and sensors 28 may be further and/or alternatively capable of detecting a seismic response generated by active seismic sensor 42. In addition, one or more active sources of electromagnetic energy may be located in the vicinity of a surveying operation. Accordingly, electromagnetic sensors 26 and/or sensors 28 may be capable of detecting one or more signals 20, 22, as discussed above, and may be additionally or alternatively capable of detecting one or more electromagnetic signals generated as a response to electromagnetic source as a result of an electroseismic or seismoelectric conversion in subservice earth formation 16. In general, system 400 may be capable of utilizing any one or more of the passive electroseismic and seismoelectric surveying 702 techniques and/or active seismic surveying 704 techniques described above. In addition, computing system 30 may be capable of correlating data from passive electroseismic surveying 702 with data detected by active seismic surveying method 704 as will be described in more detail below.

As discussed above, an active electromagnetic source may include any manmade or other active source of electromagnetic energy detectable by electromagnetic sensors 26 and/or seismic sensors 28. Electromagnetic source may include a source of electromagnetic energy capable of generating an electromagnetic response signal 20 or seismic signal 22 in a similar manner as discussed above with respect to passive electromagnetic source 12.

Active seismic source 42 may represent any appropriate active source of seismic energy 44 including thumpers, dynamite, vibrators or other sources of manmade seismic energy. Seismic sensors 28 may be configured to detect active response signals generated by active seismic source 42. In some embodiments, seismic sensors 28 may be capable of detecting both response signals from active seismic source 42 and signals 20. Alternatively, particular seismic sensors 28 may be configured to detect one type of signal or the other.

In operation, computing system 30 may be capable of utilizing active seismic sources 42 and seismic sensors 28 to perform active seismic surveying 704. In addition, computing system 30 may utilize sensors 26 and/or sensors 28 to perform passive electroseismic and seismoelectric surveying 702. Computing system 30 may be capable of utilizing these techniques in any suitable manner. For example, computing system 30 may primarily utilize active seismic surveying 704 to detect seismic data which may reveal structure, depth, and location of subsurface formation 16. During periods in which response signals generated by active source 42 are reduced and/or attenuated, computing system 30 may receive signals 20 and/or 22 detected by sensors 26 and/or 28. For example, computing system 30 may utilize sensors 26 and/or 28 between the seismic events generated by active seismic source 42.

Additionally or in the alternative, computing system 30 may be capable of detecting signals 20 and 22 at substantially the same time or at overlapping times during which active source 42 is generating seismic signals 44. In such embodiments, computing system 30 may include appropriate filters to remove the signals generated by active seismic source 42 using any appropriate technique including predictive filtering in a similar manner as discussed above. In such embodiments, passive electroseismic or seismoelectric data may treat the signals generated by seismic source 42 as noise. Accordingly, those signals may be filtered from those data while a separate processing task may actively process response signals generated as a result of signals 44 from active source 42 in order to determine the various properties of subsurface earth formation 16 based on those active seismic signals.

Computing system 30 may be capable of correlating data received as a result of passive electroseismic or seismoelectric surveying 702 and/or data received as a result of seismic surveying 704. For example, seismic data may be analyzed by computing system 30 to determine a depth of a specific boundary 18 or other feature of subsurface formation 18. Once such features are identified, those features may be used as a baseline in the analysis of passive survey data. Depth information from active seismic surveying, in some embodiments, be used as an assumption of depth when utilizing passive seismic surveying. For example, depth information obtained as a result of seismic surveying 704 may be utilized in the frequency depth function discussed above with respect to FIG. 1 in order to determine a baseline depth from which other depths and/or other features of subsurface formation 16 utilizing passive surveying technique 702 may be determined. Alternatively or in addition, data from both survey techniques may be formatted and/or integrated into a single data set and the combined data may be analyzed to identify properties of subsurface formation 16.

As a result, by utilizing multiple surveying techniques, additional information regarding subsurface 16 may be obtained than would otherwise be available utilizing active seismic surveying 704 alone. For example, seismology technique 702 may provide structural information regarding subsurface earth formation 16 while passive electroseismic surveying 702 may provide structural and electrical properties related to the presence of hydrocarbons. Data from both techniques may be capable of confirming the presence of hydrocarbons or other minerals. In addition, the combination of the two survey techniques may provide the ability to identify more readily stratigraphic traps, meandering streams and other irregular subsurface earth formation 16 which may contain hydrocarbons or other minerals of interest.

Figure 5:
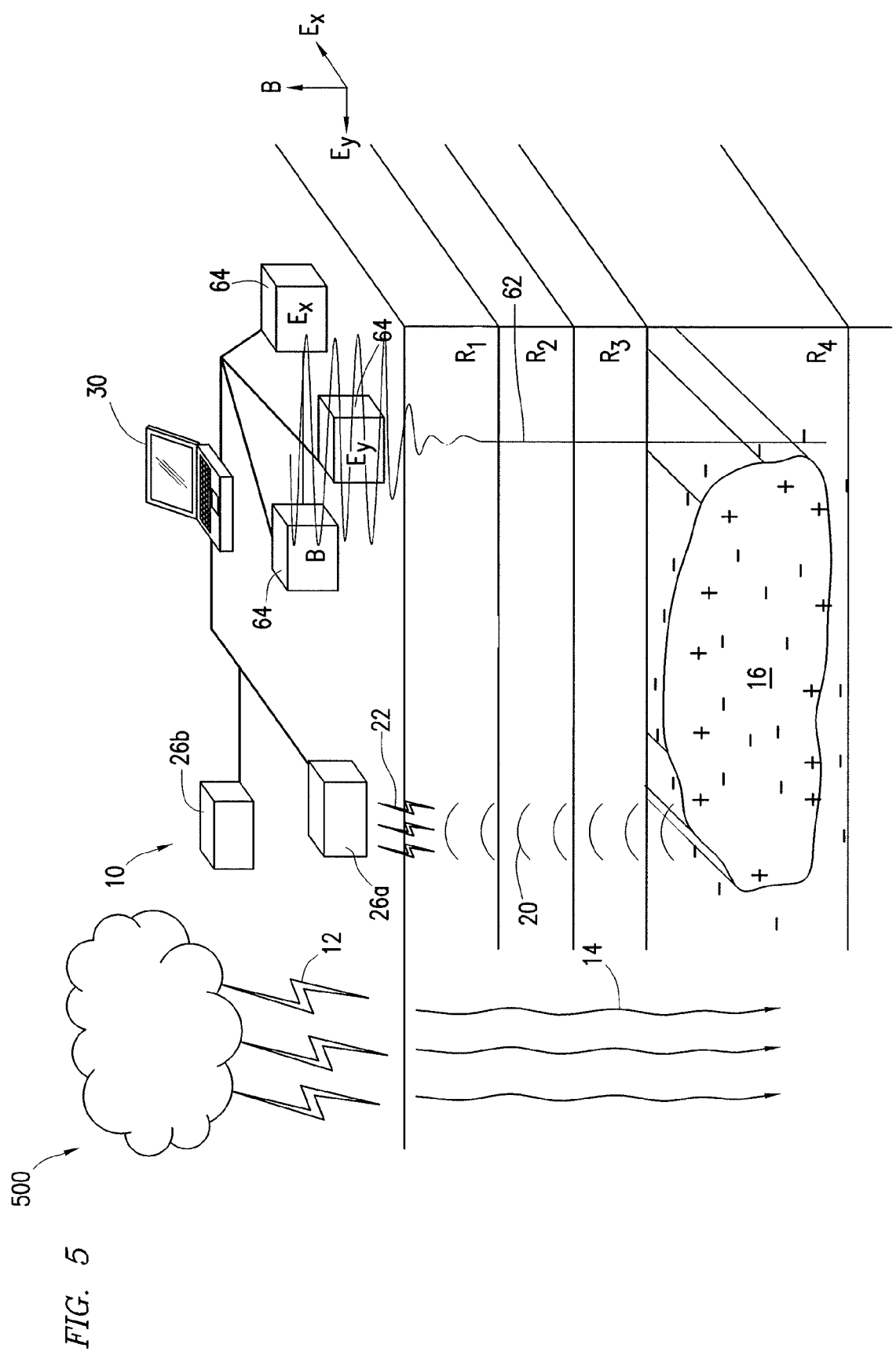
FIG. 5 is a perspective drawing illustrating an example surveying system utilizing passive electroseismic and seismoelectric surveying techniques and controlled source electromagnetic surveying techniques.

FIG. 5 is a perspective drawing illustrating an example surveying system 500 utilizing passive electroseismic and seismoelectric surveying 702 techniques and magnetotelluric surveying 710. As illustrated, system 500 includes electromagnetic sensors 26, seismic sensors 28, computing system 30, which are described above with respect to FIG. 1 and may operate in a similar manner as described above with respect to system 10. As illustrated, system 500 may also include electromagnetic sensors 64 which may be capable of detecting magnetotelluric signals, which are described above with respect to FIG. 3. While not illustrated, in some embodiments, system 600 may also include a controlled source of electromagnetic radiation which may be either generated by vehicle 50 and/or generated by various electrodes which may be disposed on the ocean floor or other appropriate location. System 500 may additionally or alternatively include appropriate components for performing IP surveying 716.

Electromagnetic sensor 64 may be capable of detecting magnetotelluric signal 62. Electromagnetic sensor 64 may be similar to any one of the embodiments of sensors 26 discussed above and operating to discuss to detect electromagnetic signal 62. Sensor 64 may be configured to detect horizontal components of the earth's background electromagnetic field 64 which are useful for processing by computing system 30 in magnetotelluric surveying 710.

In operation, system 500 may utilize magnetotelluric surveying 710, passive electroseismic or seismoelectric surveying 702 and/or CSEM 708 in order to determine properties of subsurface earth formation 16. In addition or in the alternative, various correlation techniques may be utilized to correlate data between the various survey methods. For example, magnetotelluric surveying 710 may be utilized by computing system 30 to confirm electrical conductivity, which may be indicative of the types of materials in subsurface formation 16. Passive electroseismic surveying 702 may provide well-tested geometry. Data from both techniques may be capable of confirming the presence of hydrocarbons or other minerals. In addition, the combination of the two survey techniques may provide the ability to identify more readily stratigraphic traps, meandering streams and other irregular subsurface earth formation 16 which may contain hydrocarbons or other minerals of interest.

Figure 6:
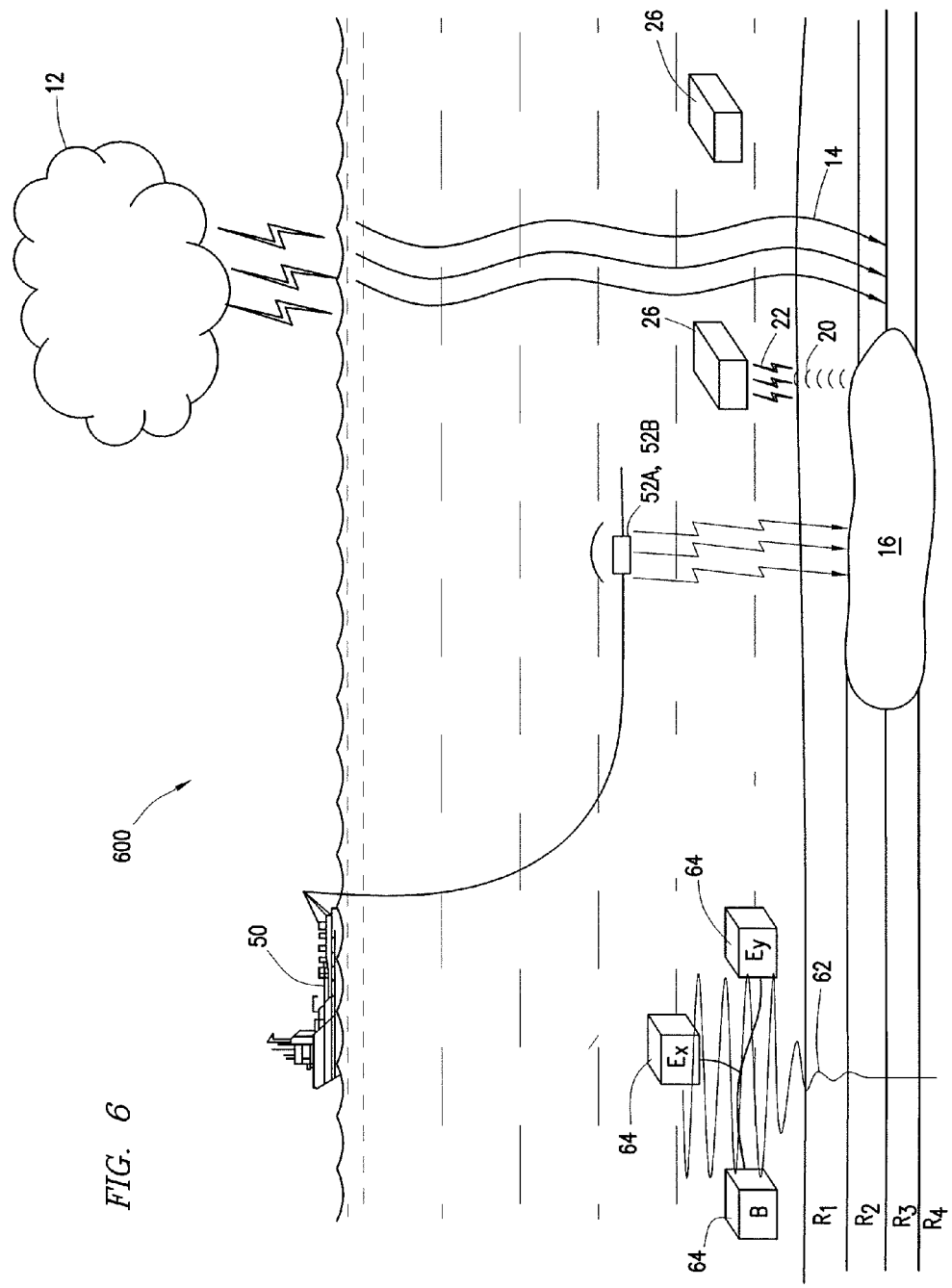
FIG. 6 is a perspective drawing illustrating an example surveying system utilizing passive electroseismic and seismoelectric surveying techniques and magnetotelluric surveying techniques.

FIG. 6 is a perspective drawing illustrating an example surveying system 600 utilizing passive electroseismic and seismoelectric surveying 702 techniques and CSEM surveying 708. As illustrated, system 600 includes a vehicle 50 which may be capable of operating in water, including deep water operations. Vehicle 50 may be capable of towing or pulling electrodes 52, sensors 26, and/or sensors 64. Sensors 26 which may be capable of detecting electromagnetic signals generated by subsurface formation 16, which may be at some distance below the floor of the body of water. Sensors 64 may be capable of detecting magnetotelluric signals 62. In some embodiments, sensors 26 may additionally or alternatively be disposed on the seafloor and/or bed of a body of water. Electromagnetic sensors 64 and/or sensors 26 may be capable of transmitting information wirelessly to computing system 30, which may be located on vehicle 50. Additionally or alternatively, sensors 64 and/or sensors 26 may store information locally and/or may be retrieved by vehicle 50. Electrodes 52 may be used to generate a high current signal that may be transmitted into the Earth through the body of water. Computing system 30 may be housed in vehicle 50 or other structure capable of holding power transformers and other power generation equipment capable of generating the appropriate amount of current required to penetrate the Earth using electrodes 52.

Electrodes 52 may include positive electrode 52A and negative electrode 52B. Electrodes 52 may be of any appropriate length and arranged in any appropriate manner with respect to the Earth capable to generate a source of current that can penetrate into the Earth. For example, a current may be induced to flow into the Earth from negative electrode 52B and return from the Earth to positive electrode 52A. The current may be modulated by subsurface formation 16. Accordingly, sensors 26 may be capable of detecting a modulation caused by subsurface formation 16 within the signals returned to electrode 52A.

In operation, computing system 30 may be capable of utilizing electrodes 52 to perform CSEM surveying 708. In addition, computing system 30 may utilize sensors 26 and/or sensors 28 to perform passive electroseismic and seismoelectric surveying 702. Computing system 30 may be capable of utilizing these techniques in any suitable manner. For example, computing system 30 may primarily utilize CSEM surveying 708 to detect electromagnetic survey data. During periods in which response signals from electrodes 52 are reduced and/or attenuated, computing system 30 may receive signals 20 and/or 22 detected by sensors 26 and/or 28. For example, computing system 30 may utilize sensors 26 and/or 28 between the times in which currents are generated by electrodes 52.

Computing system 30 may be capable of correlating and processing survey data received as a result of CSEM techniques 708 and passive electroseismic and seismoelectric surveying 702. In some embodiments, computing system 30 may additionally be capable of correlating and processing data received as result of magnetotelluric surveying 710. As a result, by utilizing multiple surveying techniques, additional information regarding subsurface 16 may be obtained than would otherwise be available utilizing CSEM techniques 708 or magnetotelluric surveying 710 alone. For example, CSEM surveying 708 may be utilized by computing system 30 to confirm high electrical resistivity which may be utilized to indicate the presence of subsurface earth formation 16. Passive electroseismic surveying 702 may provide well-tested geometry. Data from both techniques may be capable of confirming the presence of hydrocarbons or other minerals. In addition, the combination of the two survey techniques may provide the ability to identify more readily stratigraphic traps, meandering streams and other irregular subsurface earth formation 16 which may contain hydrocarbons or other minerals of interest.

Figure 7:
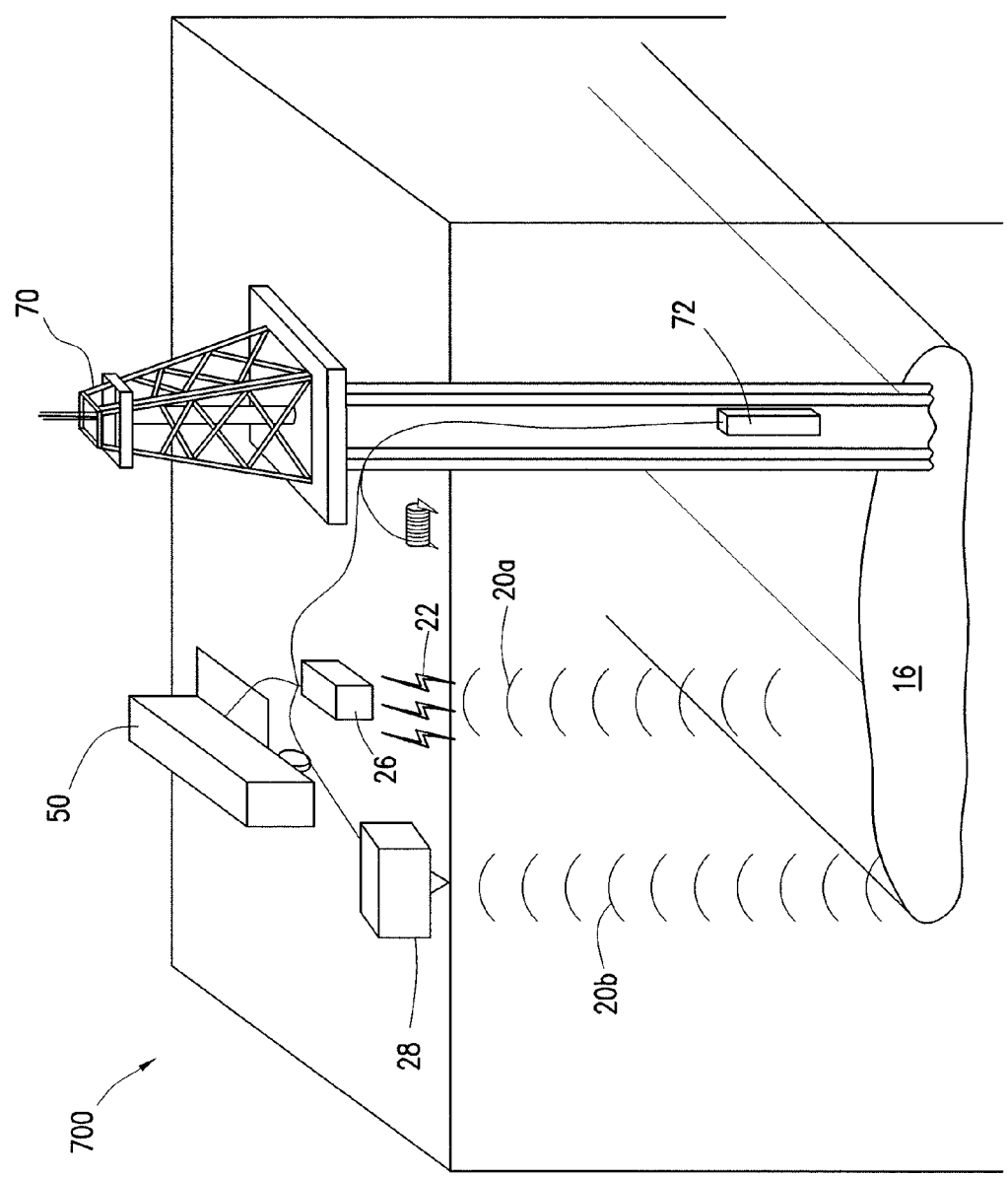
FIG. 7 is a perspective drawing illustrating an example surveying system utilizing passive electroseismic and seismoelectric surveying techniques and logging techniques.

FIG. 7 is a perspective drawing illustrating an example surveying system 700 utilizing passive electroseismic and seismoelectric surveying 702 techniques and SP logging 720 techniques. As illustrated, system 700 includes sensors 26 and 28, logging facility 50 and potentiometer 72 which may be disposed in a well bore of a drilling operation 70.

Logging facility 50 may include computing system 30 and other equipment appropriate for logging drilling operation 70, including the ability to process signals received from potentiometer 72. Survey data received as a result of SP logging by detecting the potentiometer 72 may be correlated with passive survey data received by sensors 26 and/or 28. For example, SP logging data may provide extremely reliable depth and/or resistivity information for subsurface earth formation 16 which may be used as a baseline in processing signals received from sensors 26 and/or 28 according to passive survey methods 702. Data from both techniques may be capable of confirming the presence of hydrocarbons or other minerals. In addition, the combination of the two survey techniques may provide the ability to identify more readily stratigraphic traps, meandering streams and other irregular subsurface earth formation 16 which may contain hydrocarbons or other minerals of interest.

Figure 8:
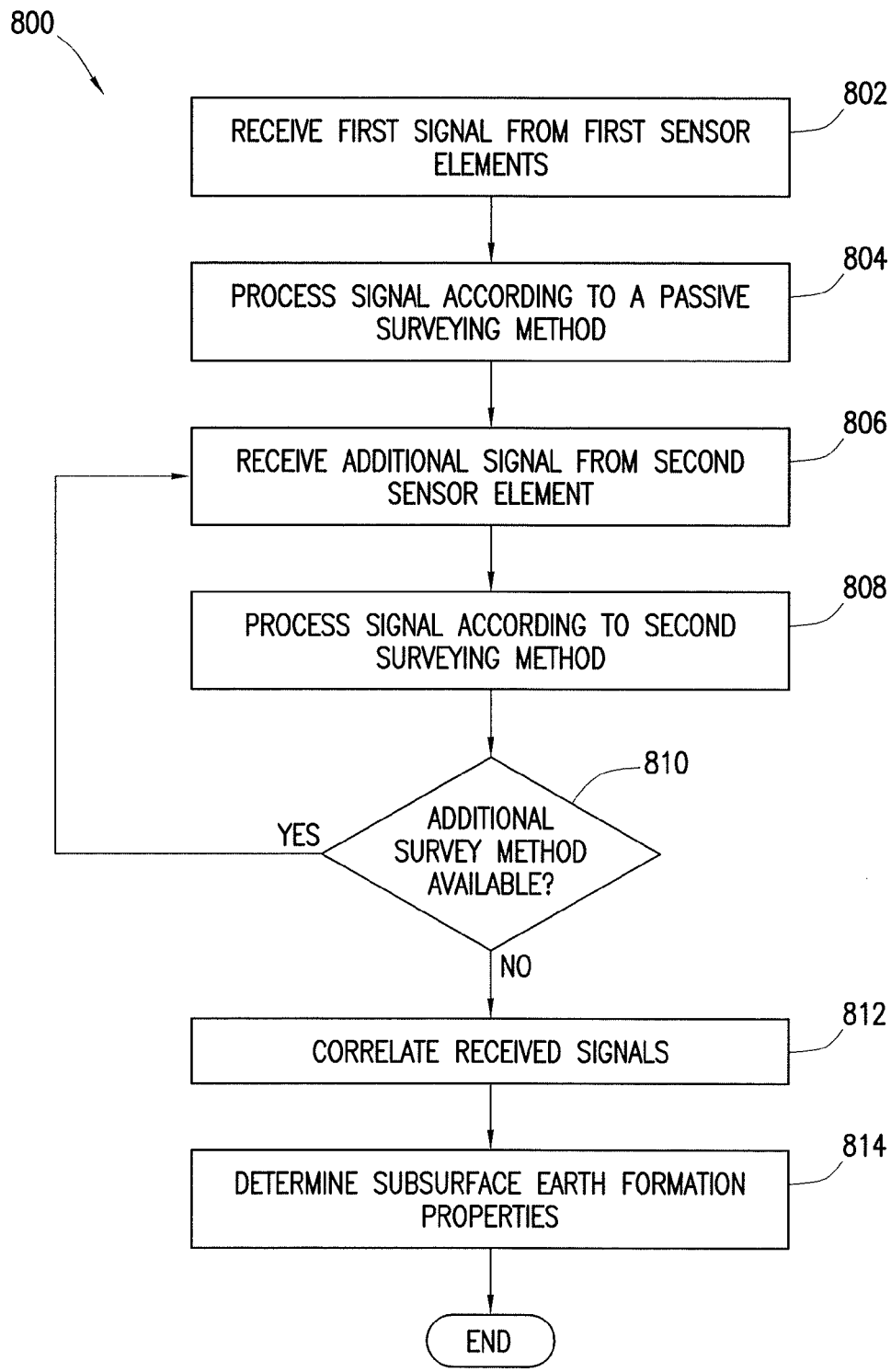
FIG. 8 is a flowchart illustrating an example method for correlating data received from various geophysical survey methods.

FIG. 8 is a flowchart illustrating an example method 800 for correlating data received from various geophysical survey methods. Method 800 begins in step 802 at which first signals are received from first sensor elements. For example, signals 20 and/or 22 may be detected by sensors 26 and/or 28 and transmitted to computing system 30. At step 804, computing system 30 may process the signals according to passive survey method 700 using any of the techniques discussed above. At step 806, computing system 30 may receive additional signals from second sensor elements. For example, computing system 30 may receive signals generated as a result of any of the aforementioned survey techniques including any one or more of the survey methods described above with respect to FIG. 3.

At step 808, computing system 30 may process those signals according to the particular survey method associated with those signals. At step 810, computing system 30 may determine whether additional survey method data are available and may then utilize those additional methods to receive additional signals from other sensor elements at step 806 after which those signals may be processed at step 808. Accordingly, computing system 30 may be capable of proactively utilizing available survey methods when configured to use those methods. For example, during an active survey operation 704, computing system 30 may be configured to automatically initiate signals received from sensors 26 and/ or 28 during periods in which the active survey signals from active source 42 are attenuated and/or negligible, as discussed above.

At step 812, computing system 30 may be capable of correlating any of the received signals according to any of the above survey methods including any of the aforementioned correlation techniques discussed with respect to FIGS. 1-7. At step 814, various subsurface properties may be determined based on individual survey methods alone and/or based on the correlation of the received signals performed at step 812. After step 814 is performed, computing system 30 may perform any other appropriate computing task such as generating and/or updating three dimensional, four dimensional or two dimensional models of subsurface earth formation 16. For example, computing system 30 may gradually move over time in order to take large amounts of data, samples or particular areas which may be very large in comparison with the extent of the area that is capable of being surveyed by an array of sensors at any one location.

Figure 9:
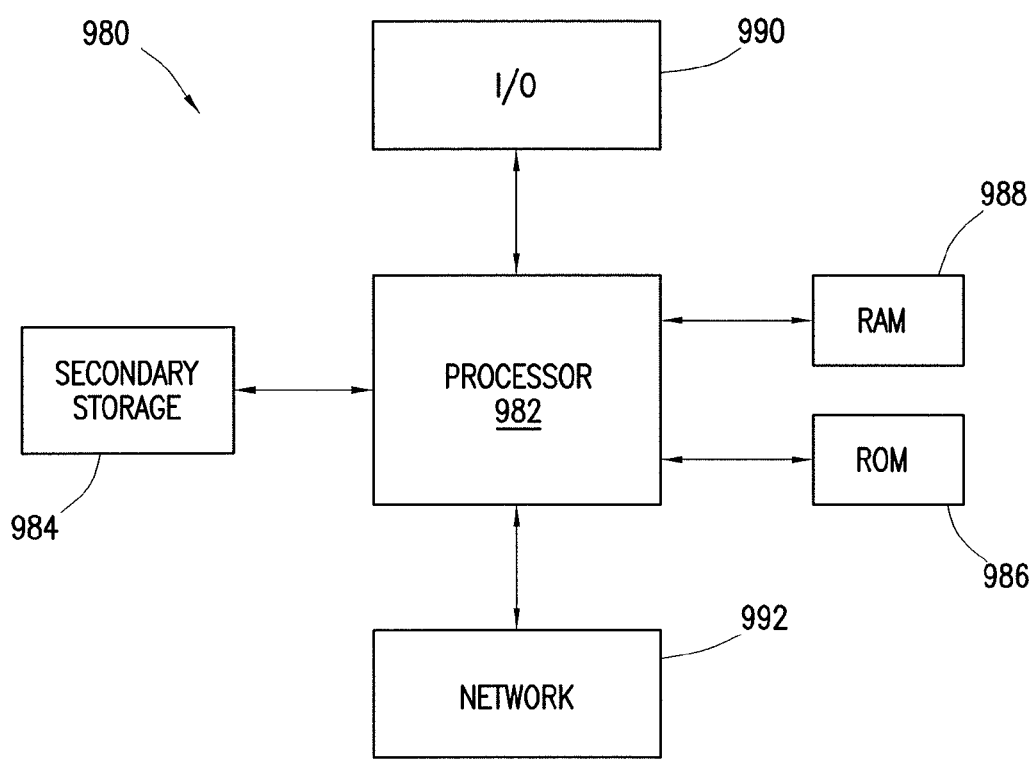
FIG. 9 is a block diagram illustrating an example computer system suitable for implementing one or more embodiments disclosed herein.

FIG. 9 illustrates an example computer system 30 suitable for implementing one or more embodiments disclosed herein. The computer system 30 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

It is understood that by programming and/or loading executable instructions onto the computing system 30, at least one of the CPU 982, the RAM 988, and the ROM 986 are changed, transforming the computing system 30 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In some embodiments, computing system 30 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing system 30 to provide the functionality of a number of servers that is not directly bound to the number of computers in the computing system 30. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In some embodiments, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computing system 30, at least portions of the contents of the computer program product to the secondary storage 984, to the ROM 986, to the RAM 988, and/or to other non-volatile memory and volatile memory of the computing system 30. The processor 982 may process the executable instructions and/or data structures in part by directly accessing the computer program product, for example by reading from a CD-ROM disk inserted into a disk drive peripheral of the computing system 30. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computing system 30.

In some contexts, a baseband signal and/or a signal embodied in a carrier wave may be referred to as a transitory signal. In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A method for surveying, comprising:
receiving, by a processor, first survey data from a first source, the first source comprising a first signal generated by a subsurface earth formation in response to a passive-source electromagnetic signal, wherein the electromagnetic signal is generated by an electroseismic or seismoelectric conversion of the passive-source electromagnetic signal;
receiving, by the processor, second survey data from a second source;
processing the first survey data and the second survey data to determine one or more properties of a subsurface earth formation;
generating a model of the subsurface earth formation based, at least in part, on the one or more properties of a subsurface earth formation; and
wherein the passive-source electromagnetic signal includes the earth's natural electromagnetic field and wherein the processing the first survey data and the second survey data to determine the one or more properties of the subsurface formation is based, at least in part, on a correlation of the earth's electromagnetic field and the electromagnetic signal generated by the electroseismic or seismoelectric conversion of the earth's natural electromagnetic field.

2. The method of claim 1, wherein the model of the subsurface earth formation is a three-dimensional model.

3. The method of claim 1, wherein the model of the subsurface earth formation is a four-dimensional model.

4. The method of claim 3, wherein the four-dimensional model is a time-based model.

5. The method of claim 1, further comprising:
updating the model of the subsurface earth formation based, at least in part, on the one or more properties of a subsurface earth formation.

6. The method of claim 1, wherein the first signal comprises a vertical component of an electromagnetic signal or a seismic signal.

7. The method of claim 1, wherein processing the first survey data comprises:
applying at least one time-domain filter or at least one frequency-domain filter to the first survey data to obtain filtered first survey data; and
identifying a signal of interest from the filtered first survey data, the signal of interest indicating the one or more properties of the subsurface earth formation.

8. The method of claim 1, wherein the second source comprises a second signal generated by a subsurface earth formation in response to a controlled source electromagnetic signal, the controlled source electromagnetic signal generated by a power source configured to drive an electric current into the earth.

9. The method of claim 1, wherein the second source comprises a second signal generated by a subsurface earth formation in response to an active source of seismic energy.

10. The method of claim 1, wherein the second source comprises a measurement of a horizontal electromagnetic field at the surface of the earth, the horizontal electromagnetic field responsive to the subsurface earth formation.

11. The method of claim 1, wherein the second survey data is obtained by a second plurality of sensors configured to be arranged in a pattern and operable to detect a horizontal electromagnetic field at the surface of the earth, the horizontal electromagnetic field responsive to the subsurface earth formation.

12. The method of claim 1, wherein the second available source comprises a passive measurement of spontaneous potential generated between a ground sensor and a wellbore at least one depth.

13. A system comprising:
a plurality of sensors operable to detect first survey data by detecting a first signal generated by a subsurface earth formation in response to a passive-source electromagnetic signal, wherein the electromagnetic signal is generated by an electroseismic or seismoelectric conversion of the passive-source electromagnetic signal;
a processor operable to:
receive first survey data from at least one of the plurality of sensors;
receive second survey data from a second source;
process the first survey data and the second survey data to determine one or more properties of a subsurface earth formation; and
generate a model of the subsurface earth formation based, at least in part, on the one or more properties of a subsurface earth formation
wherein the passive-source electromagnetic signal includes the earth's natural electromagnetic field and further wherein processing the first survey data and the second survey data to determine the one or more properties of the subsurface earth formation is based, at least in part, on a correlation of the earth's electromagnetic field and the electromagnetic signal generated by the electroseismic or seismoelectric conversion of the earth's natural electromagnetic field.

14. The system of claim 13, wherein the processor is further operable to:
update the model of the subsurface earth formation based, at least in part, on the one or more properties of a subsurface earth formation.

15. The system of claim 13, further comprising a lock-in amplifier to isolate the electromagnetic signal.

16. A system comprising:
a plurality of sensors operable to detect first survey data by detecting a first signal generated by a subsurface earth formation in response to a passive-source electromagnetic signal, wherein the electromagnetic signal is generated by an electroseismic or seismoelectric conversion of the passive-source electromagnetic signal;
a lock-in amplifier to isolate the electromagnetic signal;
a processor operable to:
receive first survey data from at least one of the plurality of sensors;
receive second survey data from a second source;
process the first survey data, the second survey data, and the isolated electromagnetic signal to determine one or more properties of a subsurface earth formation; and
generate a model of the subsurface earth formation based, at least in part, on the one or more properties of a subsurface earth formation wherein the passive-source electromagnetic signal includes the earth's natural electromagnetic field and further wherein processing the first survey data and the second survey data to determine the one or more properties of the subsurface earth formation is based, at least in part, on a correlation of the earth's electromagnetic field and the electromagnetic signal generated by the electroseismic or seismoelectric conversion of the earth's natural electromagnetic field.

17. The system of claim 16, wherein the processor is further operable to:
update the model of the subsurface earth formation based, at least in part, on the one or more properties of a subsurface earth formation.

18. The system of claim 16, wherein the model of the subsurface earth formation is a three-dimensional model.

19. The system of claim 16, wherein the model of the subsurface earth formation is a four-dimensional model.

20. The system of claim 19, wherein the four-dimensional model is a time-based model.

* * * * *